US012320018B2

(12) United States Patent
Wong

(10) Patent No.: US 12,320,018 B2
(45) Date of Patent: Jun. 3, 2025

(54) CORRUGATED ELECTRODES FOR ELECTROCHEMICAL APPLICATIONS

(71) Applicant: Lawrence Livermore National Security, LLC, Livermore, CA (US)

(72) Inventor: Andrew Wong, Emeryville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 105 days.

(21) Appl. No.: 17/532,974

(22) Filed: Nov. 22, 2021

(65) Prior Publication Data

US 2022/0162762 A1 May 26, 2022

Related U.S. Application Data

(60) Provisional application No. 63/117,323, filed on Nov. 23, 2020.

(51) Int. Cl.
*C25B 11/02* (2021.01)
*C25B 3/03* (2021.01)
(Continued)

(52) U.S. Cl.
CPC ............... *C25B 11/02* (2013.01); *C25B 3/03* (2021.01); *C25B 3/26* (2021.01); *H01M 8/0258* (2013.01)

(58) Field of Classification Search
CPC ........... C25B 13/02; C25B 1/26; C25B 1/265; C25B 1/34–46; H01M 4/0483;
(Continued)

(56) References Cited

U.S. PATENT DOCUMENTS 4,013,525 A * 3/1977 Emsley .................. C25B 11/02
204/266
4,149,956 A * 4/1979 Bess, Sr. ................. C25B 11/03
204/290.13
(Continued)

FOREIGN PATENT DOCUMENTS

CA 1067956 A 12/1979
EP 0082643 A2 6/1983
(Continued)

OTHER PUBLICATIONS

Seh et al., "Combining theory and experiment in electrocatalysis: Insights into materials design," Science, vol. 355, Jan. 13, 2017, 14 pages.
(Continued)

*Primary Examiner* — Brian W Cohen
*Assistant Examiner* — Andrew Koltonow
(74) *Attorney, Agent, or Firm* — Zilka-Kotab, P.C.

(57) ABSTRACT

An electrode includes a substrate having a body and a plurality of elongate first lands projecting away from the body. Each pair of adjacent lands define a channel therebetween, where the plurality of elongate first lands defines a plurality of first channels. The substrate defines an x-y-z coordinate system, where each of the plurality of elongate first lands defines a longitudinal axis about parallel to the x-y plane. Moreover, each of the plurality of elongate first lands projects away from the body by a height in the z-direction. In addition, the electrode includes an inlet and an outlet where the plurality of first channels are configured to allow flow of fluid from the inlet to the outlet.

22 Claims, 15 Drawing Sheets

(51) Int. Cl.
*C25B 3/26* (2021.01)
*H01M 8/0258* (2016.01)

(58) Field of Classification Search
CPC ............ H01M 4/8875; H01M 8/0254; H01M 8/0258–0265; C02F 2001/46152
See application file for complete search history.

(56) References Cited

U.S. PATENT DOCUMENTS

| | | | | |
|---|---|---|---|---|
| 4,642,173 | A * | 2/1987 | Koziol | C25D 17/12 205/97 |
| 4,695,355 | A * | 9/1987 | Koziol | C25B 11/02 204/252 |
| 4,988,583 | A * | 1/1991 | Watkins | H01M 8/026 429/492 |
| 5,589,044 | A * | 12/1996 | Scannell | C25B 11/02 204/288.2 |
| 8,865,366 | B2 | 10/2014 | Sugita et al. | |
| 11,173,545 | B2 | 11/2021 | Qi et al. | |
| 2004/0151969 | A1 | 8/2004 | Joos et al. | |
| 2006/0099481 | A1 | 5/2006 | Ji et al. | |
| 2010/0196800 | A1 | 8/2010 | Markoski et al. | |
| 2011/0076590 | A1 * | 3/2011 | Kozakai | H01M 8/0258 429/480 |
| 2014/0158526 | A1 | 6/2014 | Guo et al. | |
| 2015/0171435 | A1 * | 6/2015 | Haltiner, Jr. | H01M 8/2432 429/514 |
| 2016/0126558 | A1 * | 5/2016 | Lewis | B33Y 40/20 264/447 |
| 2019/0118264 | A1 | 4/2019 | Qi et al. | |
| 2019/0309242 | A1 * | 10/2019 | Knipe | C12P 5/023 |

FOREIGN PATENT DOCUMENTS

| | | |
|---|---|---|
| JP | H06267555 A | 9/1994 |
| JP | 2002203571 A | 7/2002 |
| JP | 2017037849 A | 2/2017 |
| JP | 6284602 B2 | 2/2018 |

OTHER PUBLICATIONS

Zheng et al., "Multiscale metallic metamaterials, " Nature Materials, vol. 15, Jul. 18, 2016, 9 pages.
International Search Report and Written Opinion from PCT Application No. PCT/US2021/060396, dated Apr. 22, 2022.
Corral et al., "Advanced manufacturing for electrosynthesis of fuels and chemicals from CO2," Energy & Environmental Science, vol. 14, 2021, pp. 3064-3074.
Jing et al., "In situ electrosynthesis of anthraquinone electrolytes in aqueous flow batteries," Green Chemistry, vol. 22, 2020, pp. 6084-6092.
Park et al., "Optimal lamellar arrangement in fish gills," PNAS, vol. 111, No. 22, Jun. 3, 2014, pp. 8067-8070.
Peters et al., "Scalable and safe synthetic organic electroreduction inspired by Li-ion battery chemistry," Science, vol. 363, Feb. 22, 2019, pp. 838-845.
Rosen et al., "Total Synthesis of Dixiamycin B by Electrochemical Oxidation," Journal of the American Chemical Society, vol. 136, 2014, pp. 5571-5574.
Wang et al., "Bio-inspired design of an auxiliary fishbone-shaped cathode flow field pattern for polymer electrolyte membrane fuel cells," Energy Conversion and Management, vol. 227, 2021, pp. 1-10.
Gerhardt et al., "The Effect of Interdigitated Channel and Land Dimensions on Flow Cell Performance," Journal of the Electrochemical Society, vol. 165, 2018, pp. A2625-A2643.
Yao et al., "3D Printed Capacitor with Ultrahigh Hundreds mg/cm2 Level MnO2 Loading," Lawrence Livermore Laboratories, May 15, 2018, 26 pages.
Qi et al., U.S. Appl. No. 15/790,810, filed Oct. 23, 2017.
International Preliminary Examination Report from PCT Application No. PCT/US2021/060396, dated May 16, 2023.
Extended European Search Report from European Application No. 21895776.9-1103, dated Mar. 31, 2025, 7 pages.

* cited by examiner

CORRUGATED ELECTRODES FOR ELECTROCHEMICAL APPLICATIONS

RELATED APPLICATIONS

This application claims priority to Provisional U.S. Appl. No. 63/117,323 filed on Nov. 23, 2020, which is herein incorporated by reference.

This invention was made with Government support under Contract No. DE-AC52-07NA27344 awarded by the United States Department of Energy. The Government has certain rights in the invention.

BACKGROUND

Concerns over carbon dioxide ($CO_2$) accumulation in the atmosphere and volatile carbon feedstock supplies with an evolving electricity grid have driven exploration into the conversion of $CO_2$ to useful fuels, chemicals, and materials. Electrochemical conversion of $CO_2$ has been the primary focus due to the rapid rise of renewable electricity generation. Among traditional electrochemical reactor configurations, gas diffusion electrodes (GDEs) and membrane-electrode assemblies (MEAs) have been the most widely reported and developed.

As depicted in FIG. 1A, a GDE half-cell includes a flowing gas layer and a liquid electrolyte layer for flowing or non-flowing liquid separated by the GDE. Two half-cells are electronically isolated by a membrane, e.g., a membrane-separator. A catalyst layer on a conductive material is positioned between the gas diffusion layer and the liquid electrolyte layer to facilitate a reaction. This configuration allows for either (1) a reactant gas to permeate into the GDE, undergo a redox reaction, and diffuse away as either a gas product or a liquid product, or (2) a reactant liquid undergoes a redox reaction and diffuses away as either a gas product or a liquid product. This reactor configuration has the advantage of determining the triple-phase interaction between the gas, liquid, and the conductive material (electrode), and permits control over both fluids. However, the liquid gap between the catalyst and the membrane is highly resistive and leads to high parasitic energy dissipation. The substantial ion-conducting pathlength between the GDE and the membrane-separator leads to high ohmic resistance.

To address the ohmic resistance challenges, MEA configurations, as depicted in FIG. 1B, use a zero-gap architecture where a solid portion of the electrode is in direct contact with the membrane to minimize the ion-conducting pathlength. Most fuel cells use this configuration to achieve high current and power densities. The MEA configuration requires a single-phase material such as a flowing reactant gas or flowing reactant liquid; however, the system is not compatible with two flowing species. The electrode assembly of a MEA has a type of electrochemical architecture that involves a core electrically conductive material, being often porous, pressed up against a membrane. The membrane and the conductive electrode are combined together, often sandwiching a catalyst and ionomer mixture layer. Because of this, MEAs are challenged by a host of environmental factors including bubble entrapment, flooding, dehydration, and salt precipitation. Furthermore, they have poorly defined triple-phase interfaces that can limit the ultimate performance.

FIG. 1C illustrates a full electrochemical cell comprising two MEA half-cells separated by a membrane/separator. A half-cell incorporating MEAs often include a stack of materials including a flow field for fluid distribution, a porous, conductive electrode where the majority of the electrochemical reaction takes place, and a membrane/separator to prevent electrical shorting but to allow ionic contact between the two half-cells. Each half-cell includes a flow field for efficient electrolyte distribution, and an electrode for the electrochemical reaction. The flow field can also double as a current collector for facile electron conduction. The MEA can be porous to allow for high surface area for electrochemical reactions. The drawbacks of the conventional system include a bulky apparatus with multiple parts, poorly defined triple-phase interfaces, tortuous electronic conduction, ionic conduction, and fluid flow paths, etc. Moreover, the conventional system allows only one type of fluid, either gas or liquid, and does not allow gas and liquid to flow simultaneously through the reactor in a controlled manner.

It would be desirable for an electrochemical cell reactor to allow high volumetric flow rates of liquid with minimal resistance and enable high diffusion of a dissolved gas to a solid surface. Furthermore, the system needs to be able to provide facile iconic conduction within the liquid phase and exhibit high electronic conductivity within the solid phase, and throughout, the system ideally would maintain structural integrity during operation.

SUMMARY

In one inventive aspect, an electrode includes a substrate having a body and a plurality of elongate first lands projecting away from the body. Each pair of adjacent lands define a channel therebetween, where the plurality of elongate first lands defines a plurality of first channels. The substrate defines an x-y-z coordinate system, where each of the plurality of elongate first lands defines a longitudinal axis about parallel to the x-y plane. Moreover, each of the plurality of elongate first lands projects away from the body by a height in the z-direction. In addition, the electrode includes an inlet and an outlet where the plurality of first channels are configured to allow flow of fluid from the inlet to the outlet.

In another inventive aspect, an electrochemical reactor includes a plurality of electrodes. Each electrode includes a substrate having a body and a plurality of elongate lands projecting away from the body. Each pair of adjacent lands defines a channel therebetween, where the plurality of elongate lands defines a plurality of channels. In addition, each electrode includes an inlet and an outlet, where the plurality of channels are configured to allow flow of a fluid from the inlet to the outlet. At least two of the plurality of electrodes are connected by a membrane. The membrane is coupled to at least some of the elongate lands of the first of the two electrodes so that the elongate lands are interposed between the body of the substrate of the first electrode and the membrane. Moreover, the membrane is coupled to at least some of the elongate lands of the second of the two electrodes so that the elongate lands are interposed between the body of the substrate of the second electrode and the membrane.

In yet another inventive aspect, an electrode includes a substrate having a plurality of elongate lands forming elongate projections, where adjacent lands are spaced from each other and define a channel therebetween. The plurality of lands define a plurality of channels. The electrode includes a catalyst disposed on at least a portion of the substrate in the plurality of channels. In addition, the electrode includes an inlet and an outlet, where the inlet is in fluid communication with the outlet through the plurality of channels.

Other aspects and advantages of the present invention will become apparent from the following detailed description, which, when taken in conjunction with the drawings, illustrate by way of example the principles of the invention.

DETAILED DESCRIPTION

Figure 1A:
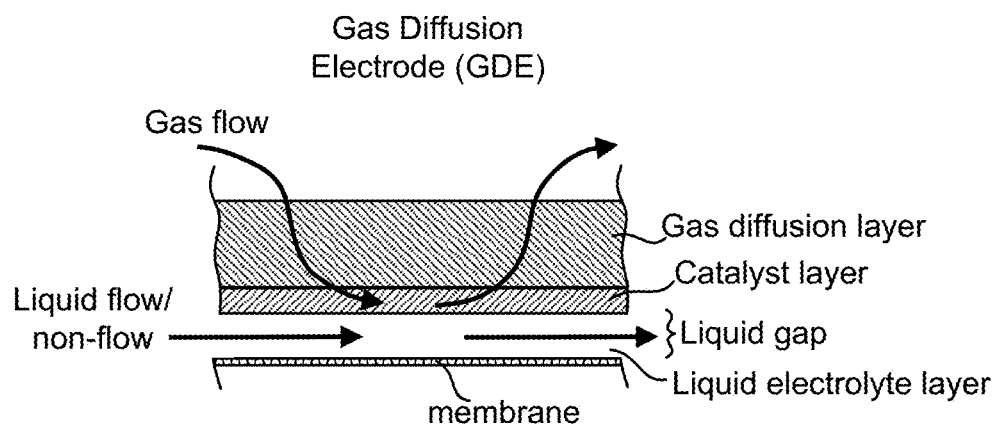
FIG. 1A is a schematic drawing of the architecture of a gas diffusion electrode (GDE).

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm ±1 nm, a temperature of about 50° C. refers to a temperature of 50° C. ±5° C., etc.

It is noted that ambient room temperature may be defined as a temperature in a range of about 20° C. to about 25° C.

It is also noted that, as used in the specification and the appended claims, wt.% is defined as the percentage of weight of a particular component to the total weight/mass of the mixture. Vol. % is defined as the percentage of volume of a particular compound to the total volume of the mixture or compound. Mol.% is defined as the percentage of moles of a particular component to the total moles of the mixture or compound. Atomic % (at. %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form products as described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extruded freeform fabrication, or other equivalent techniques and therefore exhibit unique structural and compositional characteristics conveyed via the precise control allowed by such techniques. DIW involves the forcing of an "ink" or paste-like material through a nozzle while moving a substrate beneath the nozzle whose motion creates a pattern to the strand. Parts are printed by layering the strands into a three-dimensional (3D) object, with or without porosity. The part retains a microstructure formed during printing due to a complex thixotropic rheology of the ink. The ink then cures either during or post printing to form a permanent shape.

The following description discloses several preferred inventive aspects of an electrode having a corrugated architecture for electrochemical reactions and/or related systems and methods.

In one general inventive aspect, an electrode includes a substrate having a body and a plurality of elongate first lands projecting away from the body. Each pair of adjacent lands define a channel therebetween, where the plurality of elongate first lands defines a plurality of first channels. The substrate defines an x-y-z coordinate system, where each of the plurality of elongate first lands defines a longitudinal axis about parallel to the x-y plane. Moreover, each of the plurality of elongate first lands projects away from the body by a height in the z-direction. In addition, the electrode includes an inlet and an outlet where the plurality of first channels are configured to allow flow of fluid from the inlet to the outlet.

In another general inventive aspect, an electrochemical reactor includes a plurality of electrodes. Each electrode includes a substrate having a body and a plurality of elongate lands projecting away from the body. Each pair of adjacent lands defines a channel therebetween, where the plurality of elongate lands defines a plurality of channels. In addition, each electrode includes an inlet and an outlet, where the plurality of channels are configured to allow flow of a fluid from the inlet to the outlet. At least two of the plurality of electrodes are connected by a membrane. The membrane is coupled to at least some of the elongate lands of the first of the two electrodes so that the elongate lands are interposed between the body of the substrate of the first electrode and the membrane. Moreover, the membrane is coupled to at least some of the elongate lands of the second of the two electrodes so that the elongate lands are interposed between the body of the substrate of the second electrode and the membrane.

In yet another general inventive aspect, an electrode includes a substrate having a plurality of elongate lands forming elongate projections, where adjacent lands are spaced from each other and define a channel therebetween. The plurality of lands define a plurality of channels. The electrode includes a catalyst disposed on at least a portion of the substrate in the plurality of channels. In addition, the electrode includes an inlet and an outlet, where the inlet is in fluid communication with the outlet through the plurality of channels.

A list of acronyms used in the description is provided below.

| | |
|---|---|
| 1D | One-dimensional |
| 3D | Three-dimensional |
| AM | Additive manufacturing |
| aq | aqueous |
| C. | Celsius |
| CEA | corrugated electrode architecture |
| $CO_2$ | carbon dioxide |
| CVD | chemical vapor deposition |
| DIW | Direct Ink Writing |
| EPD | electrophoretic deposition |
| GDE | gas diffusion electrode |
| IDFF | interdigitated flow field |
| MEA | membrane electrode assemblies |
| mm | millimeter |
| mol. % | mole percent |
| PTFE | polytetrafluoroethylene |
| PVD | physical vapor deposition |

According to one inventive aspect, a corrugated electrode architecture (CEA) addresses the shortcomings of both MEAs and GDEs. The CEA allows a liquid to flow within a liquid layer while still maintaining an intimate membrane electrode contact. Preferably, the CEA allows high volumetric flow rates of liquid with minimal resistance. A liquid phase may include dissolved gases, and thus the CEA enables high diffusion of a dissolved gas to a solid surface. Moreover, a CEA provides facile ionic conduction within the liquid phase. A CEA exhibits high electronic conductivity within the solid phase. In preferred approaches, a CEA maintains structural integrity during operation.

Figure 2:
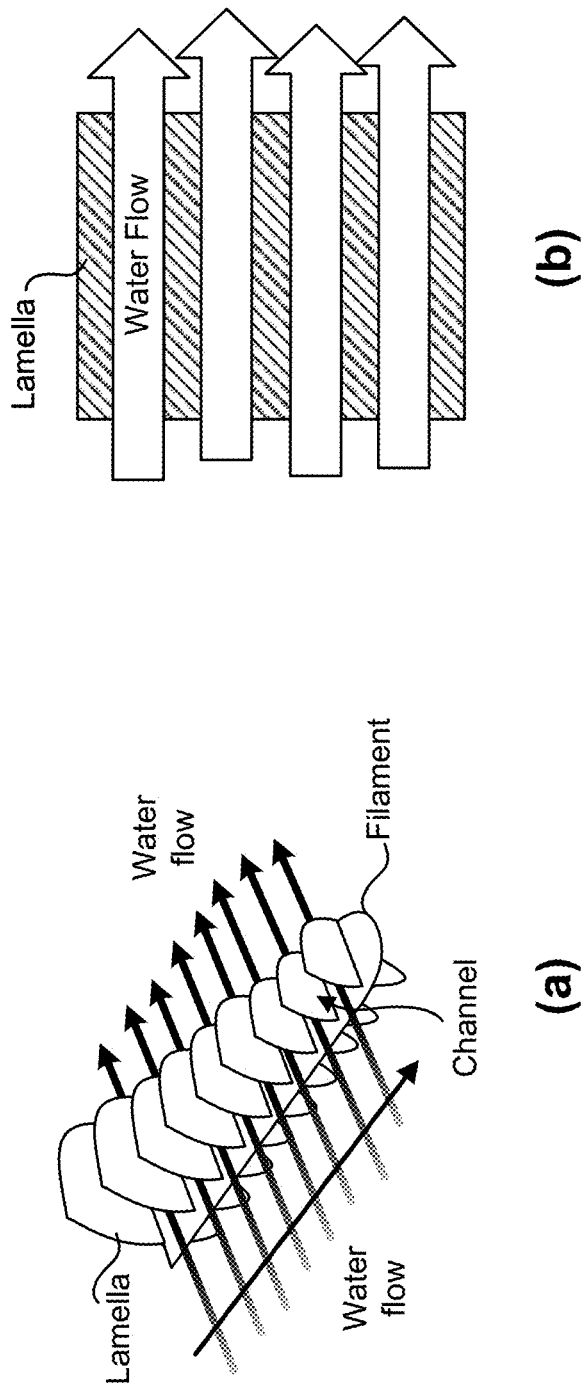
FIG. 2 depicts schematic drawings of a lamella system of water flow in fish gills. Part (a) is a perspective view of the flow of water through a lamella structure, part (b) is a top view of the flow of water through the lamella.

According to one inventive aspect, corrugated electrode architecture may resemble bio-inspired pneumatic shape architecture (e.g., aquatic fish gills), allowing for an intricate interplay between gas:liquid:solid reaction exchange. The gills of a fish allow the intake of water along filaments that branch from the gills. Each filament includes an array of lamellae that allow the flow of water across the filaments. The architecture of fish gills, as shown in the schematic drawing in part (a) of FIG. 2, includes filaments having an array of lamellae on the surface of each filament. As the water flows alongside the filament, the lamellae allow the flow of water to cross the filament through channels defined by the adjacent lamellae. As shown in a top view of the schematic drawing of part (b), the water flows in the channels between the lamellae, and has extensive contact with the surface of the lamellae as well as the surface of the filament. The lamellae array facilitates unimpeded fluid transport across the gill surface while providing exceptionally high surface area and minimal diffusion distance for gas exchange. The physical structure can be analyzed to determine a biologically optimal architecture which is strikingly similar across a wide variety of fish species.

According to one inventive aspect, a corrugated electrode architecture (CEA) includes a flow field, a current collector, and elongate lands having a corrugated architecture in a single structure for high-efficiency electrochemical reactions.

Figure 3A:
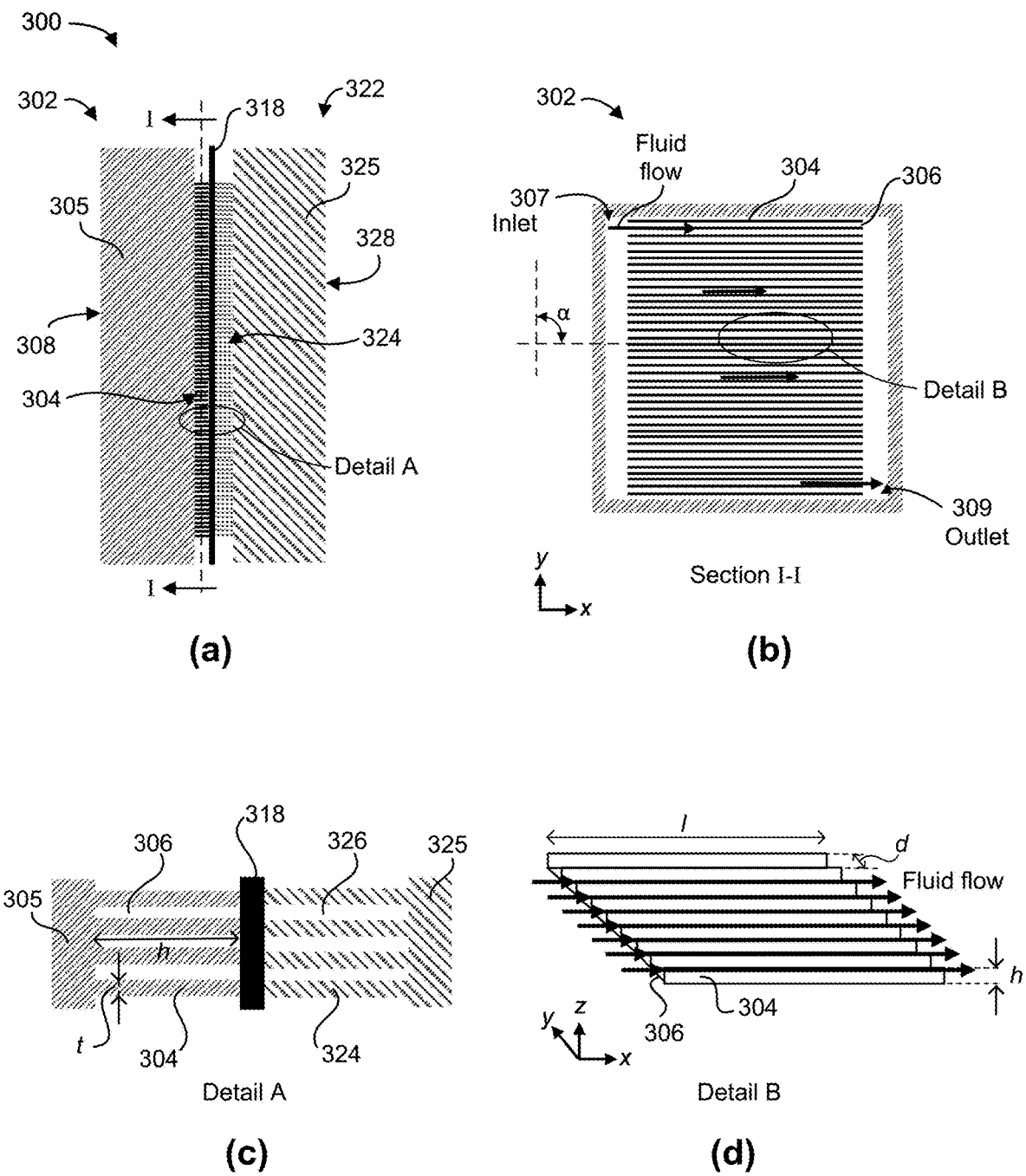
FIG. 3A depicts schematic drawings of an electrochemical reactor having corrugated electrode architecture, according to one inventive aspect. Part (a) depicts two half-cells with a membrane therebetween, each half-cell having a corrugated architecture electrode, part (b) depicts Section I-I of part (a), part (c) is a magnified view of Detail A of part (a), and part (d) is a magnified perspective view of Detail B of part (b).
Figure 3B:
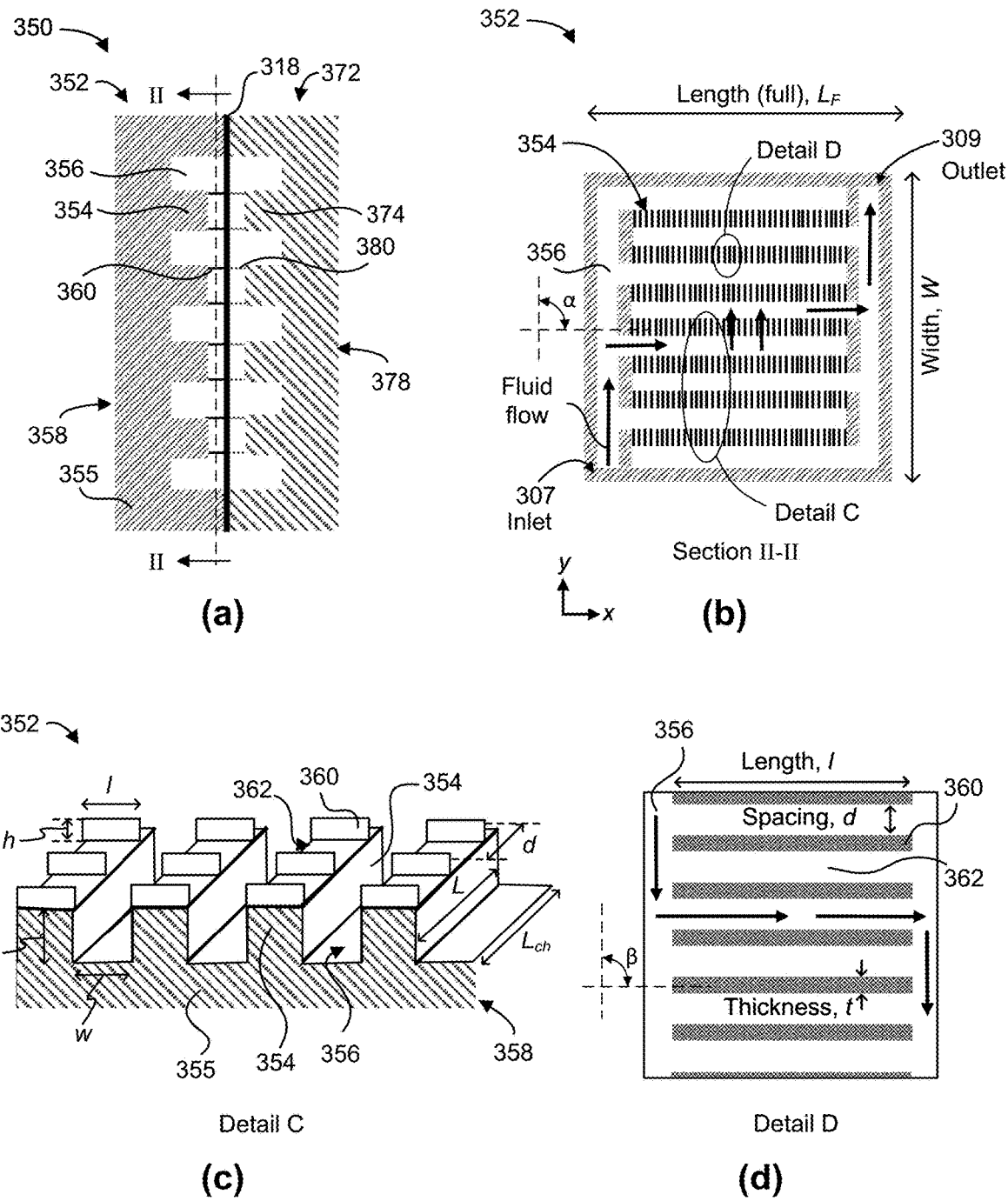
FIG. 3B depicts schematic drawings of an electrochemical reactor having a corrugated electrode architecture having an interdigitated flow field, according to one inventive aspect. Part (a) depicts two half-cells with a membrane therebetween, each half-cell having a corrugated electrode architecture having a hierarchy of channels for fluid flow, part (b) depicts Section II-II of part (a), part (c) is a magnified perspective view of Detail C of part (b), and part (d) is a magnified view of Detail D of part (b).

FIGS. 3A and 3B depict schematic diagrams of electrodes 302, 352 having corrugated electrode architectures, in accordance with various inventive aspects. As an option, the present electrodes 302, 352 may be implemented in conjunction with features from any other inventive concept listed herein, such as those described with reference to the other FIGS. Of course, however, such electrodes 302, 352 and others presented herein may be used in various applications and/or in permutations which may or may not be specifically described in the illustrative embodiments listed herein. Further, the electrodes 302, 352 presented herein may be used in any desired environment.

According to one inventive aspect, an electrode has a corrugated architecture, e.g., a corrugated electrode architecture (CEA). In one approach, a CEA includes a corrugated electrode layer. In one approach, the corrugated electrode layer includes a corrugated pattern of features for flow of fluid from an inlet to an outlet of the electrode. In another approach, the corrugated electrode layer is characterized by the architecture of an interdigitated flow field that includes corrugated pattern of features for flow of fluid from an inlet to an outlet of the electrode.

FIG. 3A describes the architecture of a reactor 300 incorporating a corrugated electrode architecture (CEA), according to one inventive aspect. Part (a) illustrates a side view of a reactor 300 having two corrugated electrode architectures 302, 322. As shown for reactor 300 each CEA 302, 322 may represent a half-cell with a membrane 318 therebetween. The configuration of the corrugated electrode architecture 302, 322 is one approach, other configurations of construction of a corrugated electrode architecture as described in FIGS. 3B, 4, 5, and 6 may be used in the reactor.

For each of the corrugated electrode architectures (CEA) 302, 322, the side view of a portion of the reactor 300 in FIG. 3A part (a) and the portion magnified in part (c), depicts the flow of a fluid through a series of first channels 306 between a series of elongate first lands 304, e.g., lamella like structures, for one CEA 302 and likewise, a flow of a fluid through a series of first channels 326 defined between a series of elongate first lands 324 e.g., lamella-like structures, for the other CEA 322 on the opposite side of the membrane 318.

As illustrated with electrode 302 of FIG. 3A part (a), according to one inventive aspect, an electrode 302 includes a substrate 308 having a body 305 and a plurality of elongate first lands 304. The substrate 308 defines an x-y-z coordinate system, where each of the plurality of elongate first lands 304 defines a longitudinal axis about parallel to the x-y plane. Each pair of adjacent first lands 304 defines a respective first channel 306 therebetween. As shown in part (b) and the magnified perspective view in part (c), a plurality of elongate first lands 304 defines a plurality of first channels 306. The elongate first lands 304 project away from the body 305 by a height h in a z-direction.

A magnified view a portion of the CEA 302, 322 illustrates a plurality of lamella-like structures, e.g., elongate first lands 304 of CEA 302 and the first channels 306 defined between each pair of adjacent elongate first lands 304. The other CEA 322, on the opposite side of the membrane 318, includes a plurality of lamella-like structures, e.g., elongate first lands 324 and the first channels 326 defined between each pair of adjacent elongate fist lands 324. The elongate first lands 304, 324 project away from the body 305, 325, respectively, by a height h in the z-direction (as shown for the elongate first lands 304 of CEA 302).

As illustrated in FIG. 3A part (b), in one inventive aspect, an angle α shows an angular relationship between the longitudinal axis of the first lands 304 and y-axis. In various approaches, the longitudinal axes of the first lands 304 may be oriented at an angle α in a range of 5° to 90° from the y-axis. In some approaches, the longitudinal axes of the first lands are oriented at an angle α in a range of 45° to 90° from the y-axis, in a range of 60° to 90° from the y-axis, in a range of 60° to 90° from the y-axis, in a range of 75° to 90° from the y-axis, in a range of 5° to 45° from the y-axis, in a range of 15° to 30° from the y-axis, in a range of 30° to 60° from the y-axis, in a range of 15° to 30° from the y-axis, in a range of 45° to 80° from the y-axis, in a range of 15° to 30° from the y-axis, in a range of 45° to 60° from the y-axis, etc.

According to a preferred approach, the CEA 302 includes an inlet 307 and an outlet 309, where the plurality of first channels 306 may be configured to allow flow of fluid from the inlet 307 to the outlet 309. For each CEA 302, 322, the arrangement of elongate first lands 304, 324 and respective first channels 306, 326 form a flow field for flowing a fluid from an inlet to an outlet of the respective CEA. In a preferred approach, the inlet 307 is in fluid communication with the outlet 309 through the plurality of first channels 306.

In some approaches, the inlet and outlet may be integral to the substrate, for example, the inlet and outlet may be present as pore, hole, channel, etc. in the substrate structure. In one approach, the inlet and outlet may be a separate structure attached, coupled, etc. to the substrate.

In some approaches, the substrate 308, 328 of CEA 302, 322, respectively, may function as a current collector. In one approach, one CEA 302 may be a cathode half-cell, and the other CEA 322 may be an anode half-cell, separated by a membrane 318 e.g., a separator.

As illustrated in FIG. 3A part (a), the inventive aspect may include a membrane 318 positioned between the CEA 302 being a cathode and the CEA 322 being an anode. The membrane may be a membrane generally known in the art for use in an electrochemical reactor. In a preferred approach, the membrane 318 may be coupled to the electrode 302 so that at least some of the plurality of elongate first lands 304, e.g., lamella-like structures, are interposed between the body 305 of the substrate 308 and the membrane 318. Moreover, the membrane 318 may be coupled directly to at least some of the plurality of first lands 304. In addition, the membrane 318 may be coupled to the electrode 322 so that at least some of the plurality of elongate first lands 324, e.g., lamella-like structures, are interposed between the body 325 of the substrate 328 and the membrane 318. Moreover, the membrane 318 may be coupled directly to at least some of the plurality of first lands 324.

Part (d) of FIG. 3A illustrates a magnified perspective view of the flow of fluid through the first channels 306 defined between the elongate first lands 304 of electrode 302. This layer of channels represents a corrugated electrode layer. In one approach, an average longitudinal length l of at least some of the elongate first lands 304 as measured along the longitudinal axis of the respective first land 304 may be greater than an average width, e.g., an average spacing d, of an adjacent first channel 306 as measured between the adjacent first lands 304 defining the respective first channel 306. The ratio of the height h to an average width d of an adjacent first channel 306 of at least some of the elongate first lands 304 may be in a range of about 0.1 to 1000 where the average width d of the respective first channel 306 is the average distance between the adjacent first lands 304 defining the respective first channel 306. In various approaches, the height h of at least some of the first lands 304 may be in a range of greater than 0 μm and less than about 100,000 μm (10 cm). It should further be appreciated that first lands 304 may be continuous and extend across the majority of the electrode, as shown in part (b), or first lands 304 may be discontinuous so that each of first lands 304 is formed by a plurality of discrete portions aligned on a longitudinal axis.

In exemplary approaches, the width of the first channels d is a design consideration for the function of the electrode. The width/thickness t of the first lands 304, which are the lands closest to membrane 318 in the embodiment of FIG. 3A, is preferably as small as possible while still maintaining structural integrity (e.g., the first lands maintain a height in a z-direction). The width/thickness t of each first land 304 may be in a range from 0.1 μm to about 10,000 μm (1 cm). In various approaches, a ratio d/t may be in a range of about 0.1 to about 1000.

According to one inventive aspect, as illustrated in FIG. 3B, an electrode may include a combination of an interdigitated flow field (IDFF) with a corrugated electrode architecture (CEA) to allow for high-efficiency electrochemical reactions. An IDFF allows a large-area, low resistance electrolyte flow, and the corrugated electrode features allow for high surface area, small diffusion length, and facile electrolyte flow for efficient electrochemical reactions. Moreover, a combination of an IDFF and a CEA in one reactor may perform as a branching pattern of channels to increase electrochemical conversion efficiency. A branching structure (e.g., a manifold) is an architecture in which fluid passing through one first channel is directed through a plurality of second channels.

In one inventive aspect, lamella-like structures may be present on top of structures forming an interdigitated flow field. The substrate may include a plurality of elongate second lands (e.g., lamella-like structures) that extend from at least one of the pluralities of elongate first lands (fins, filaments, ribs, projections, etc.).

Part (a) of FIG. 3B illustrates a schematic drawing of an electrochemical reactor 350 having at least two electrodes 352, 372. According to one inventive aspect, an electrode 352 includes a substrate 358 having a body 355 and a plurality of elongate first lands 354. The substrate 358 defines an x-y-z coordinate system, where each of the plurality of elongate first lands 354 defines a longitudinal axis parallel to the x-y plane. Each pair of adjacent first lands 354 defines a first channel 356 therebetween.

As shown in FIG. 3B part (b) and the magnified perspective view in part (c), a plurality of elongate first lands 354 defines a plurality of first channels 356. As shown in this inventive aspect, the elongate first lands 354 project away from the body 355 by a height H in a z-direction. In addition, in a preferred approach, a plurality of elongate second lands 360 extend from at least one of the plurality of elongate first lands 354. Each pair of adjacent elongate second lands 360 define a second channel 362 therebetween. The elongate second lands 360 project away from the first lands 354 by a height h in a z-direction.

According to a preferred approach, the CEA 352 includes an inlet 307 and an outlet 309, where the plurality of channels 356, 362 may be configured to allow flow of fluid from the inlet 307 to the outlet 309. For each CEA 352, the arrangement of elongate lands 354, 360 and respective channels 356, 362 form a flow field for flowing a fluid from an inlet 307 to an outlet 309 of the CEA 352. In a preferred approach, the inlet 307 is in fluid communication with the outlet 309 through the plurality of channels 356, 362.

Looking to the flow field pattern in FIG. 3B part (b) and the magnified view in part (d), a portion of the first channels 356 may be configured to allow flow of a fluid therethrough from an inlet 307 of the electrode 352 to the second channels 362. Moreover, a second portion of the first channels 356 may be configured to allow flow of the fluid therethrough from the second channels 362 to an outlet 309 of the electrode 352.

Part (c) of FIG. 3B illustrates a magnified perspective view of a portion of the electrode 352. The structure of CEA 352 includes a substrate 358 having elongate first lands 354, fins, structures, etc. (e.g., similar to the filaments of the fish gills). As shown in this inventive aspect, a longitudinal axis of each elongate first land 354 is defined between distal ends thereof in the x-direction (i.e., parallel to the direction of $L_{ch}$ shown in part (c)). Each pair of adjacent first lands 354 defines a respective first channel 356 therebetween, and likewise, a longitudinal axis of each first channel 356 is defined between distal ends of the first channel 356 (parallel to the direction of $L_{ch}$ shown in part (c)).

The electrode 352 includes a plurality of elongate second lands 360 extending from at least one of the elongate first lands 354. Similar to the elongate first lands 304 of CEA 302, the elongate second lands 360 extending from the first lands 354 of CEA 352 are structured similar to an array of lamellae on the filament of a fish gill (see FIG. 2). As illustrated for CEA 352 in part (c) of FIG. 3B, each pair of adjacent second lands 360 defines a respective second channel 362 therebetween, and likewise, the longitudinal axis of each second channel 362 is defined between distal ends thereof in the y direction (parallel to the direction of 1 shown in part (c)).

Referring to the magnified perspective view in part (c), in some approaches, an average longitudinal length L of at least some of the first lands 354 as measured along the longitudinal axis of the respective first land 354 may be greater than an average width w of an adjacent first channel 356 as measured between the adjacent first lands 354 defining the respective first channel 356. Moreover, an average longitudinal length l of at least some of the second lands 360 as measured along a longitudinal axis of the respective second land 360 may be greater than an average width, e.g., average spacing d, of an adjacent second channel 362 as measured between the adjacent second lands 360 defining the respective second channel 362.

As illustrated in FIG. 3B part (b), in one inventive aspect, an angle α shows an angular relationship between the longitudinal axis of the first lands 354 and y-axis. In various approaches, the longitudinal axes of the first lands 354 may be oriented at an angle α in a range of 5° to 90° from the y-axis. In some approaches, the longitudinal axes of the first lands are oriented at an angle α in a range of 45° to 90° from the y-axis, in a range of 60° to 90° from the y-axis, in a range of 60° to 90° from the y-axis, in a range of 75° to 90° from the y-axis, in a range of 5° to 45° from the y-axis, in a range of 15° to 30° from the y-axis, in a range of 30° to 60° from the y-axis, in a range of 15° to 30° from the y-axis, in a range of 45° to 80° from the y-axis, in a range of 15° to 30° from the y-axis, in a range of 45° to 60° from the y-axis, etc.

As illustrated in part (d) of FIG. 3B, in one inventive aspect, an angle β shows an angular relationship between the longitudinal axis of the first lands 354 and the longitudinal axis of the second lands 360. In various approaches, the longitudinal axes of the second lands 360 may be oriented at an angle β in a range of 5° to 90° from the longitudinal axes of the first land 354 from which the respective second lands 360 extend. In various approaches, considerations may include selecting an angle β based on a length l of each of the second lands 360 where length l of the second land 360 may be increased by changing the angle different from 90° relative to the respective first lands 354, changing the flow characteristics, surface area of the second lands, etc.

In some approaches, the longitudinal axes of the second lands are oriented at an angle β in a range of 45° to 90° from the longitudinal axes of the first lands, in a range of 60° to 90° from the longitudinal axes of the first lands, in a range of 60° to 90° from the longitudinal axes of the first lands, in a range of 75° to 90° from the longitudinal axes of the first lands, in a range of 5° to 45° from the longitudinal axes of the first lands, in a range of 15° to 30° from the longitudinal axes of the first lands, in a range of 30° to 60° from the longitudinal axes of the first lands, in a range of 15° to 30° from the longitudinal axes of the first lands, in a range of 45° to 80° from the longitudinal axes of the first lands, in a range of 15° to 30° from the longitudinal axes of the first lands, in a range of 45° to 60° from the longitudinal axes of the first lands, etc.

The flow of the fluid is distributed across the electrode between the sidewalls of the first channels and between the sidewalls of the second channels as the fluid flows from the inlet to the outlet. In alternative inventive aspects, the channels may have variable widths. For example, the first channels and/or second channels may converge, e.g., the width of a channel changes from wider to narrower, as the fluid moves toward the outlet. Alternatively, the first channels and/or second channels may diverge, e.g., the width of the channel changes from narrower to wider, as the fluid moves away from the inlet. In some approaches, the first channels may taper away from the inlet and the first channels near the outlet taper to expand toward the outlet.

The height h of the lamella-like structures, e.g., the second lands 360, may preferably be tuned for optimal volumetric flow of fluid through the second channels 362. The height h of the second lands 360 corresponds to the depth of the second channels 362.

In various approaches, a ratio of the height h to an average width, e.g., an average spacing d, of at least some of the second lands 360 may be in a range of about 1 to 100 where the average width of the respective second channel 362 is the average distance, e.g., spacing d, between the adjacent second lands 360 defining the respective second channel 362. In some approach, the ratio of the h of at least some of the second lands to an average spacing d of the respective second channels 362 may be in a range of 5 to 80, in a range of 5 to 20, in a range of 10 to 50, in a range of 10 to 30, and preferably up to a ratio of about 10. In some approaches, the ratio may be in a range of 1:50.

In some approaches, the height h of the second lands 360 may be in a range of greater than 0 μm to about 100,000 μm (10 cm). In some approaches, the height h of the second lands 360 may be in a range of greater than 0 to less than 10,000 μm (1 cm). In some preferred approaches, a height h of at least some of the second lands 360 may be in a range of greater than 0 μm and less than 5,000 μm. In some approaches, the average spacing d between the second lands 360 correlates to an average width of the respective second channel 362, may be less than 10,000 microns (1 cm).

In exemplary approaches, the spacing d of the second channels 362 is a design consideration for the function of the electrode. The width/thickness t of the second lands 360, which are the lands closes to membrane 318 in the embodiment of FIG. 3B, is preferably as small as possible while still maintaining structural integrity (e.g., the second lands maintain a height in a z-direction). The width/thickness t of each second land 360 may be in a range from 0.1 μm to about 10,000 μm (1 cm). In various approaches, a ratio d/t may be in a range of about 0.1 to about 1000.

As illustrated in part (b) of FIG. 3B, the CEA 352 allows a fluid to flow (straight black arrows) from an inlet 307 to an outlet 309. A portion of the first channels 356 may be configured to allow flow of a fluid therethrough from an inlet 307 to the second channels 362, as illustrated in part (d). The second channels 362 may be configured to allow flow of fluid across the first lands 354 between adjacent first channels 356 through the second channels 362. Moreover, portion of the first channels 356 may be configured to allow flow of the fluid therethrough from the second channels 362 to an outlet 309 of the CEA 352. In a preferred approach, the inlet 307 is in fluid communication with the outlet 309 through the plurality of channels 356, 362.

The corrugated architecture of the electrode includes multiple length scales of the various dimensions of the electrode. For example, dimensions of the electrode include a full length $L_F$ and width W of the electrode (shown in part (b)). The magnified perspective view in part (b) illustrates various dimensions including length L and height H of the first lands 354 and the width w of the first channels 356, and the length l and height h of the lamella-like structures, e.g., the second lands 360 extending from the first lands 354 and the width of the second channels 362 measured as the spacing d between the second lands 360. The ratio L/l defined as a ratio of the length L of the first lands 354 to the length l of the second lands 360 may be in the range of about 1 to about 10,000. The height H of the first lands 354 and the height h of the second lands 360 may be in the range of 0 μm to about 10,000 μm. It should be appreciated that as the height H of the first lands 354 approaches 0, the second lands effectively form an embodiment of the electrode shown in FIG. 3A but having discontinuous first lands as described above.

The ratio w/d defined as a ratio of the average width w of the first channels 356 to the average width of the second channels 362 measured as the average spacing d between the second lands 360 may be in the range of about 1 to about 100,000. The branching factor, e.g., the ratio of the number of first channels 356 that feed into a number of second channels 362, may be from about 1 to about 100,000.

In some approaches, a length L of a first land 354 may be less than a length $L_{ch}$ of a first channel 356 so that the fluid pathway extends beyond the length L of the first land 354. In some approaches, the length L of the first lands 354 may be equal to or less than the full length of the electrode 352.

As illustrated in part (a) of FIG. 3B, an electrochemical reactor 350 includes a plurality of electrodes 352, 372, where at least two of the electrodes 352, 372 are connected by a membrane 318. The membrane 318 is coupled to the electrode 352 so that at least some of the plurality of first lands 354 are interposed between the body 355 of the substrate 358 and the membrane 318. Further, the membrane 318 may be coupled directly coupled to at least some of the plurality of second lands 360. The membrane 318 is also coupled to the other electrode 372 so that at least some of the plurality of first lands 374 are interposed between the body of the substrate 378 and the membrane 318. Moreover, the membrane 318 may be coupled directly to at least some of the plurality of second lands 380. In some approaches, the first electrode 352 may be a cathode and the second electrode 372 may be an anode.

In some approaches, the membrane of the electrochemical reactor may function as a charge-selective barrier. The membrane may include materials that includes a polymer that has a hydrophobic backbone providing structure and rigidity and hydrophilic groups that allow for ionic transport. Examples may include synthetic polymers with ionomer functional groups, fluoropolymer-copolymers, polymer-ceramic composites, conductive ceramics, polymers having functional groups such as sulfonic acid, ammonium, etc. In one approach, the membrane allows ionic contact between two different sides of an electrochemical cell while preventing electrical contact.

In other approaches, the membrane may also function as a separator, e.g., size-selective, non-selective barrier, etc. The membrane may also be substituted for a porous separator that allows for ionic transport. Examples may include size-exclusion membranes, porous polymers, porous ceramics or glasses, e.g., expanded polyethylene, or porous alumina etc. In another approach, the membrane functions in part as a porous separator to allow for ionic contact between two different sides of an electrochemical cell while preventing electrical shorting.

The CEA as described herein functions in a similar manner to a fish lamellae array, enabling facile, high-volume fluid transport across a high-surface area surface with minimal diffusion distance. In a fully liquid electrochemical system such as a flow battery, or dissolved $CO_{2(aq)}$ lization reactor, the small path length can result in exceptionally high single-pass conversion. In gas-fed reactors, a porous layer of the CEA may facilitate gas dissolution and diffusion at the triple-phase boundary and provide an outlet for bubbles that would be entrapped in traditional MEAs. This versatile fluid-handling capacity enables better long-term stability and performance for the electrochemical system.

Figure 1B:
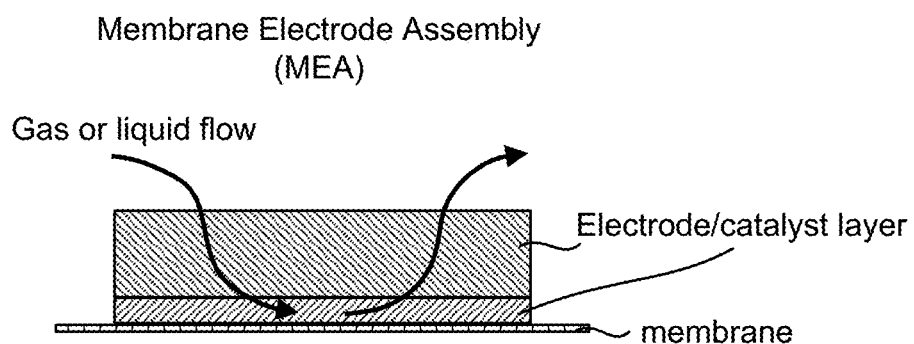
FIG. 1B is a schematic drawing of the architecture of a membrane electrode assembly (MEA).
Figure 1C:
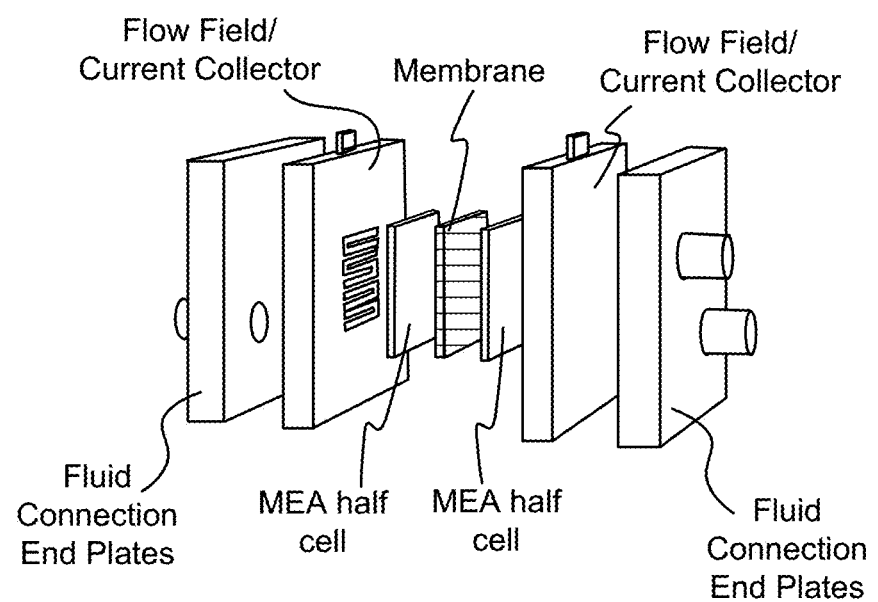
FIG. 1C is an exploded view of a membrane electrode assembly (MEA) including flow fields and end plates.

According to various inventive aspects described herein, the CEA is a single structure that functions as an electrode, a flow field, and an electrochemical reactor for causing high efficiency reactions of a fluid, e.g., gas, liquid, gas dissolved in liquid, a mixture of a gas and a liquid, etc. In sharp contrast, a conventional electrochemical reactor using a conventional MEA (as illustrated in FIG. 1C) requires additional structures such as a flow field and an electrode to be included in the reactor for causing a reaction.

Figure 4:
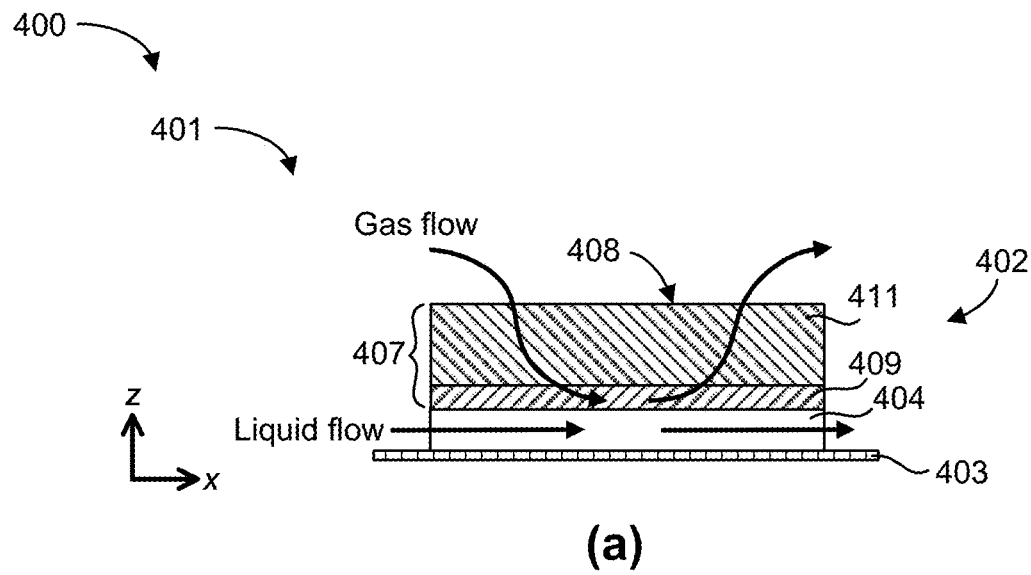
FIG. 4 depicts schematic drawings of a half-cell of an electrochemical reactor having a corrugated architecture electrode, according to one inventive aspect. Part (a) is a side view parallel to the x-z plane, and part (b) is a side-view parallel to the y-z plane.
Figure 4:
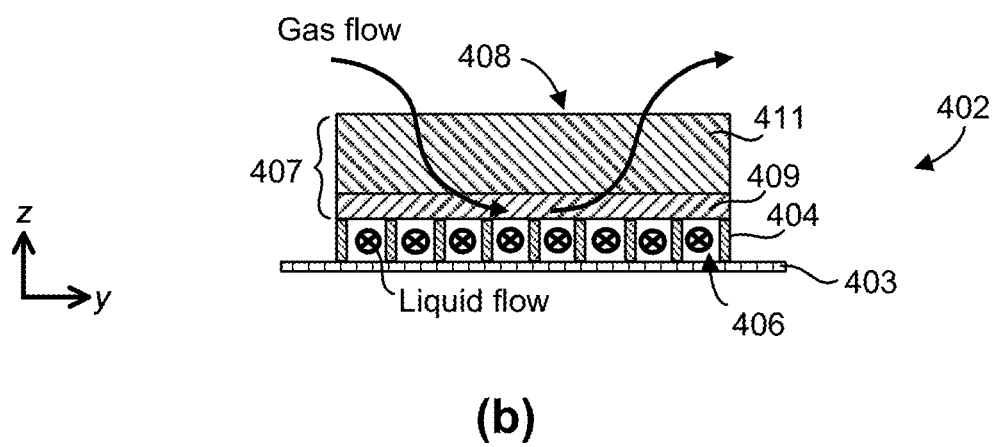

FIG. 4 depicts schematic diagrams of a portion of a half-cell 401 having corrugated electrode architecture 402, in accordance with various inventive aspects. As an option, the present half-cell 401 may be implemented in conjunction with features from any other inventive concept listed herein, such as those described with reference to the other FIGS. Of course, however, such a half cell-401 and others presented herein may be used in various applications and/or in permutations which may or may not be specifically described in the illustrative embodiments listed herein. Further, the half-cell 401 presented herein may be used in any desired environment.

The schematic drawings in FIG. 4 illustrates a portion of a half-cell 401 of an electrochemical reactor 400 having a corrugated electrode 402 having corrugated electrode architecture (e.g., CEA), according to one inventive aspect. Part (a) is a side view parallel to the x-z plane of a half-cell 401 of having a CEA 402, and part (b) is a side view parallel to the y-z plane of the half-cell 401.

The CEA 402 includes lamella-like structures, e.g., elongate first lands 404, extending from a body 407 of a substrate 408. Each pair of adjacent elongate first lands 404 define a channel 406 therebetween, as illustrated in part (b). The structure of the CEA 402 is configured to allow fluid to flow through the channels 406 defined by the respective elongate first lands 404.

The half-cell 401 includes a membrane 403 positioned on the electrode 402. In one approach, the membrane 403 is coupled to the electrode 402 so that at least some of the plurality of elongate first lands 404 are interposed between the body 407 of the substrate 408 and the membrane 403. Moreover, the membrane 318 may be coupled directly to at least some of the plurality of first lands 404. The spacing between adjacent elongate first lands 404 define the width of the respective channel 406 therebetween.

In the illustrated inventive aspect of FIG. 4, the substrate 408 may include a layer 411 constructed of porous material. In one approach, the substrate 408 having a porous layer 411 may allow a gas to flow via diffusion through the substrate 408 to the surface of the elongate first lands 404. The layer 411 having porous material may function as a porous spacer that provides a gap above the electrochemical architecture including the liquid flow through the first channels 406 of the CEA 402. In one approach, the substrate 408 may comprise a porous hydrophobic material. For example, a porous hydrophobic material may include expanded PTFE, expanded polyethylene, etc.

In one approach, the substrate 408 may include a catalyst layer 409 positioned along the body of the substrate from which elongate first lands 404 project. The surface of the elongate first lands 404 may include a catalyst material.

In some approaches, for example, a liquid-to-liquid conversion, a half-cell having a CEA may be configured without a porous layer 411. In one approach, the substrate 408 may include a layer of solid material and function as a current collector in the place of a gas diffusion layer.

In one inventive aspect, an electrode includes a substrate having a plurality of elongate first lands forming elongate projections. As illustrated in FIG. 4, an electrode 402 includes a substrate 408 having a plurality of elongate first lands 404 forming elongate projections. The adjacent first lands 404 are spaced from each other and define a first channel 406 therebetween. The plurality of lands define a plurality of channels.

A catalyst 409 may be disposed on at least a portion of the substrate 408 in the plurality of first channels 406. The electrode may include an inlet and an outlet where the inlet is in fluid communication with the outlet through the plurality of channels.

In various approaches, a catalyst material is present on the surfaces of the CEA. In one approach, a catalyst material is present on a surface of at least some of the elongate first lands within some of the plurality of first channels. The catalyst material may be present on the surface of at least some of the elongate lands that define the channels therebetween. In one approach as illustrated in FIG. 4, a catalyst material may be present on the surface of at least some of the elongate first lands 404 that define the first channels 406 therebetween, e.g., the catalyst material is present on the walls of at least some of the first channels 406. In another approach, referring to the illustration of CEA 302 in FIG. 3A, a catalyst material may be present on the surface of at least some of the elongate first lands 304 that define the first channels 306 therebetween. In yet another approach, referring to the illustration of CEA 352 in FIG. 3B, a catalyst material may be present on the surface of at least some of the elongate first lands 354 that define the first channels 356 and the surface of at least some of the elongate second lands 360 that define the second channel 362 therebetween (e.g., the walls of the first channels 356 and/or the walls of the second channels 362). For any one of these examples, the catalyst material present on the substrate and/or surface of elongate lands (e.g., walls of the respective channels) may function as a catalyst layer.

In some approaches, the substrate may include a catalyst layer. As illustrated in FIG. 4 and may be implemented in conjunction with features from any other inventive concept listed herein, such as those described with reference to the other FIGS. 3A and 3B, and FIG. 6, a substrate 408 of a CEA 402 structure may include a catalyst layer 409. A catalyst layer, coating, material, etc. may be comprised of any conductive material. In various approaches, the catalyst material may include at least one of the following: copper, tin, gold, nickel, silver, carbon etc. In some approaches, the catalyst layer may include a combination of materials.

As illustrated in FIG. 4, in one approach, the porous layer 411 and the catalyst layer 409 may form a two-layer system, with the liquid flowing beneath the layers toward the membrane 403. In one approach, a gas may flow through the substrate 408 having a porous layer 411 alongside the catalyst layer 409. In sharp contrast to a conventional GDE apparatus that requires an open chamber for the flow of fluids (see FIG. 1A for reference), the half-cell 401 having a CEA 402 has a corrugated arrangement of first lands 404 and first channels 406 coupled to the membrane 403 that allows the liquid to flow between the layer 409 and the membrane 403.

The layer of the corrugated electrode 402 includes a geometry that promotes the triple phase interface between the gas:solid:liquid. In one approach, the corrugated features (e.g., columns, walls, etc.) may be porous material. In another approach, the corrugated features may be a non-porous solid material.

The CEA structure may include a conductive material. As illustrated in any one of the CEA structure configurations (FIGS. 3A, 3B, 4, and 6), the substrate and elongate lands projecting from the substrate may be comprised of an electrically conductive material. In one approach, the substrate and first lands may be comprised of an electrically conductive material. In another approach, the substrate, first lands, and second lands may be comprised of an electrically conductive material. In various approaches, the electrically conductive material may include at least one of the following: a metal, a metal alloy, a metal oxide, a metal nitride, a metal compound, a carbon group element, a functionalized carbon, a semiconductor material, a noble metal, a conductive oxide, a transition metal, etc. For example, exemplary examples of conductive material include copper, tin, nickel, silver, zinc, gold, functionalized carbon with nitrogen, boron, etc., silicon, gallium arsenide, germanium, tungsten, etc. These are meant to be examples only, and the examples are not meant to be limiting in any way.

In one approach, the material of the corrugated electrode may be the same as the material of the catalyst layer. In another approach, the material of the corrugated electrode may be different from the catalyst layer. In some approaches, the corrugated electrode layer may include a combination of materials. For example, in one approach, the material of the first lands and the material of the second lands may be different. In one approach, the material of the first lands and the material of the second lands may be the same.

By establishing well defined fluid channels, the architecture of the corrugated electrode allows for both gas and liquid transport in a zero-gap configuration, enables a precisely defined, static triple-phase boundary and provides pathways for gas removal to prevent bubble entrapment which can impact the system performance. A zero-gap configuration may be defined as that the solid portion of the structure is in direct contact with the membrane as demonstrated in a conventional MEA architecture (as illustrated in FIG. 1B). In contrast, in a conventional GDE structure, as illustrated in FIG. 1A, the solid portion of the structure is separated from the membrane by a space filled with electrolyte, e.g., the liquid gap. Furthermore, this architecture can be constructed in a fluid-only configuration for gas-sensitive electrochemical processes.

Figure 5:
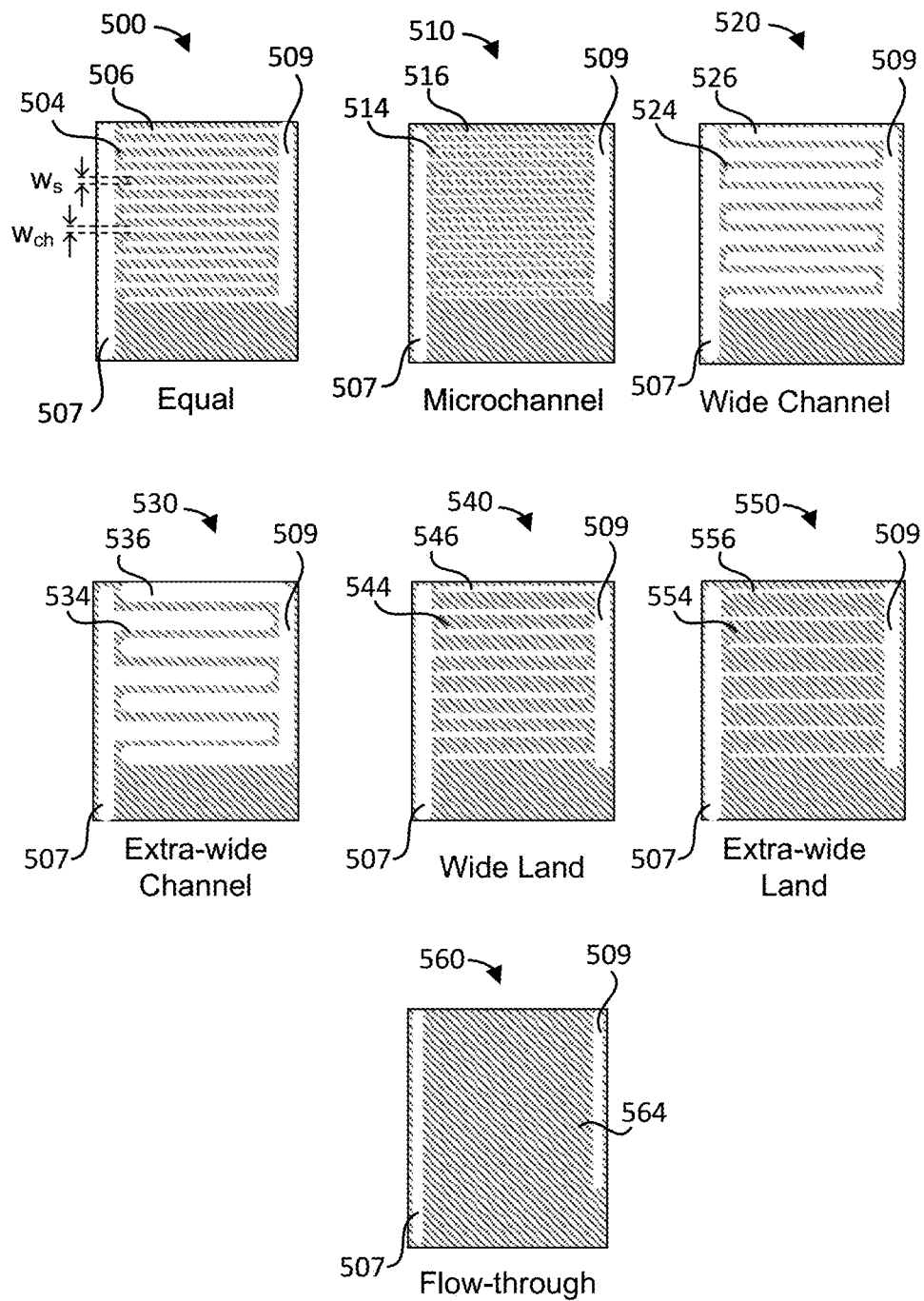
FIG. 5 depicts series of schematic diagrams of interdigitated flow fields, according to various inventive aspects.

In various approaches, the plurality of elongate lands, e.g., lamella-like structures, may be arranged in an interdigitated flow field geometry. As shown in part (b) of FIG. 3B, the first lands 354 of CEA 352 are configured in a pattern having an interdigitated flow field geometry. FIG. 5 illustrates different macroscopic length scales of an interdigitated flow field geometry for optimizing flow cell performance. For example, an interdigitated flow field 500 having an Equal pattern includes lands 504 (dark shading) being a structure having a land structure width $w_s$ and channels 506 (white) having a width $w_{ch}$ where the ratio of $w_s/w_{ch}$ is about 1, e.g., the widths are equal. The spacing between the lands 504 in a direction perpendicular to the longitudinal axis of the lands 504 defines the $w_{ch}$ of the channels 506 for the flow of fluid across the interdigitated flow field 500 from the inlet 507 to the outlet 509.

In one approach, patterns of interdigitated flow field geometry may include a Microchannel pattern where the flow field 510 includes lands 514 and channels 516 where $w_s \gg w_{ch}$ and a ratio of $w_s/w_{ch} > 1$. The spacing between the lands 514 define microscale channels 516, e.g., having $w_{ch}$ of less than 1 mm. In another approach, an interdigitated flow field geometry may include a Wide Channel pattern where the flow field 520 includes lands 524 and channels 526 where $w_s < w_{ch}$ and a ratio of $w_s/w_{ch} < 1$. The spacing between the lands 524 define wide spacing of the channels 526. In yet another approach, an interdigitated flow field geometry may include an Extra-Wide Channel pattern where the flow field 530 includes lands 534 and channels 536 where $w_s \ll w_{ch}$ and a ratio of $w_s/w_{ch} \ll 1$, and preferably $w_s/w_{ch} < \sim 0.01$. The narrow with of the lands 534 define extra-wide spacing of the channels 536.

In one approach, an interdigitated flow field geometry may include a Wide Land pattern where the flow field 540 includes lands 544 and channels 546 where $w_s > w_{ch}$ and a ratio of $w_s/w_{ch} > \sim 1$, for example $w_s/w_{ch} > \sim 5$. The larger width the lands 544 defines a narrower spacing of the channels 546. In another approach, an interdigitated flow field geometry may include an Extra-Wide Land pattern where the flow field 550 includes lands 554 and channels 556 where $w_s \gg w_{ch}$ and a ratio of $w_s/w_{ch} \gg 1$, for example, the ratio may be as high as $w_s/w_{ch} > \sim 100$ The extra-wide width of the lands 554 define a narrower spacing of the channels 556.

In one approach, a flow through geometry of flow field 560, also illustrated in part (b) of FIG. 3A, includes a continuous first land 564 that supports second channels (not shown in detail) spanning across the flow field 560 from the inlet 507 to the outlet 509. The flow through pattern allows for a larger area for the second land and channels to extend across. In one approach, the plurality of elongate second lands, e.g., lamella-like structures may be continuous across the flow field. In another approach, the plurality of elongate second lands, e.g., lamella-like structures, may be discontinuous across the flow field having spaces along length l of the elongate second lands. The flow field geometry formed by the first lands and first channels may also include fractal patterns, serpentine and multi-serpentine patterns, parallel and grid patterns, bio-inspired patterns, etc. These patterns are by way of example only and are not meant to be limiting in any way.

The corrugated electrode layer provides improvement to the conductive pathways of the electrochemical cell. In preferred approaches, the corrugated architecture includes a periodic, ordered, etc. pattern of lands and channels that provide increased surface area for causing reaction of the reactants in the flowing fluid. The corrugated electrode provides improved electrical and ionic contact between the membrane and the catalyst layer. The corrugation geometry of the corrugated electrode allows direct electrical contact with the membrane and provides more surface area and higher electrical conductivity through the region; thus, the energy penalty may be minimized thereby providing a higher performance of the system.

Figure 6:
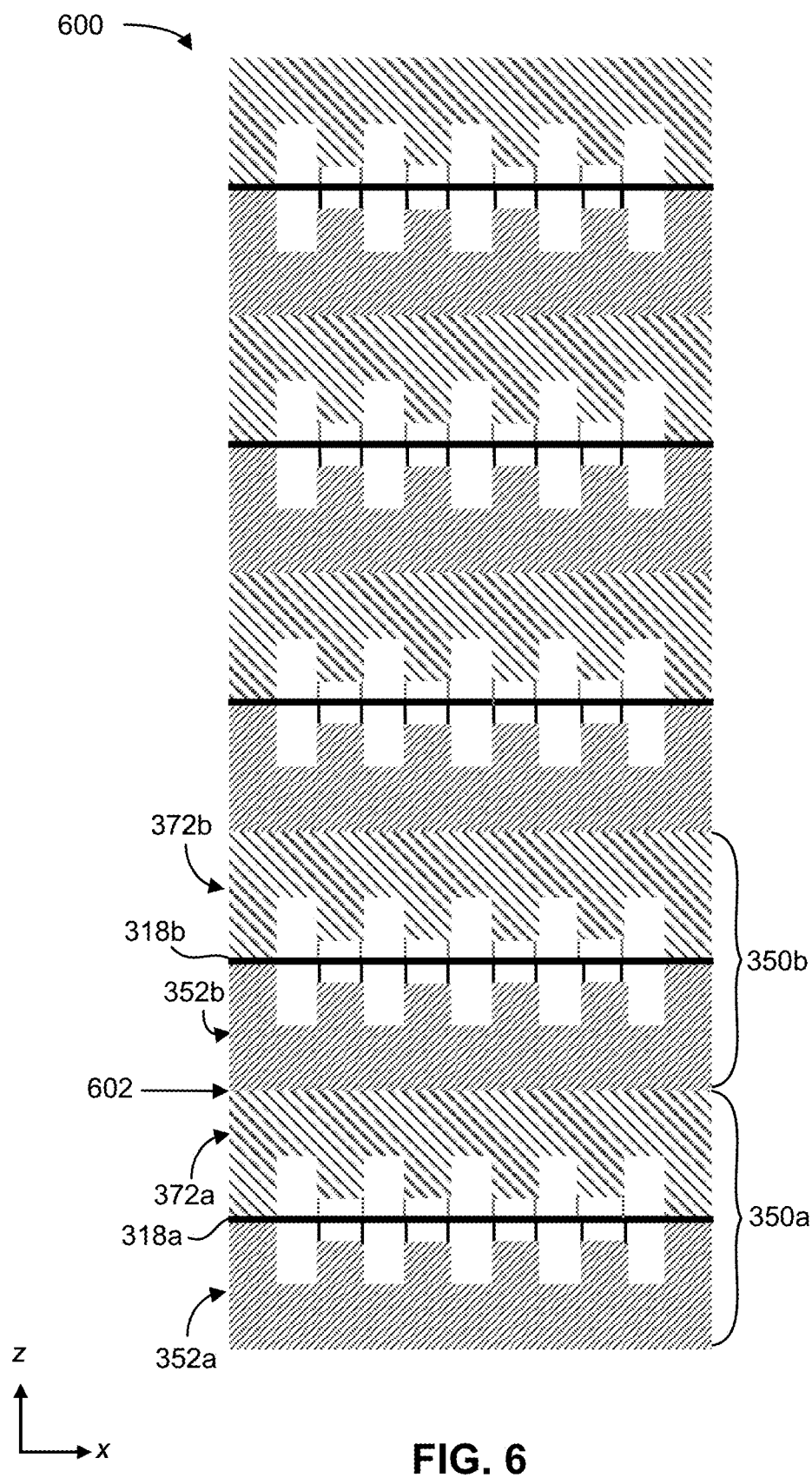
FIG. 6 is a schematic diagram of a full reactor stack system, according to one inventive aspect.

As illustrated in the schematic diagram in FIG. 6, a reactor architecture may include multiple sets of electrodes forming a full stack reactor system. According to one inventive aspect, an electrochemical reactor system 600 includes a plurality of electrochemical reactors 350a, 350b, etc. Each electrochemical reactor 350a, 350b, etc. may be representative of the electrochemical reactor 350 as described in FIG. 3B. Each electrochemical reactor 350a, 350b, etc. has a unique inlet and outlet for each reactor.

As illustrated in FIG. 6, the electrochemical reactor 600 includes a plurality of electrodes 352a, 372a, 352b, 372b, etc. Each electrode is illustrated in detail in FIG. 3B for electrodes 352 and 372. As illustrated in FIG. 6, an electrochemical reactor 600 includes at least two electrodes 352a, 372a of the plurality of electrodes connected by a membrane 318a, and at least two other electrodes 352b, 372b connected by a membrane 318b. In a preferred approach, at least two of the electrodes 372a, 352b are butted against each other with no membrane 602 therebetween.

The full-electrochemical reactor system 600 as illustrated in FIG. 6 may simplify assembly complexity and lower fabrication costs. In addition, the arrangement of reactors 350a, 350b, etc. may eliminate the need for separate bipolar plate and electrode. The zero-gap architecture minimizes resistive losses.

In some approaches, the corrugated electrode architecture (CEA) may include a simplified single channel test platform, in which repeating or symmetric features, the smallest corrugation unit, including a single channel, may be examined independently for particular characteristics including, but not limited to, surface area, reaction rate, conductivity, selectivity, etc. This may allow for better coupling between experimental results, analytical models, and computational simulations.

In one approach, a monolithic electrode architecture may be assembled, fabricated, etc. as a bipolar electrode where one portion of the electrode performs an anodic electrochemical reaction, and another portion of the electrode may perform a cathodic electrochemical reaction.

According to various inventive aspects, the bipolar electrodes as described herein may be useful in stacked electrochemical systems such as fuel cells and electrolyzers, allowing for smaller physical space, and lower materials requirements and costs.

Figures 7A, 7B:
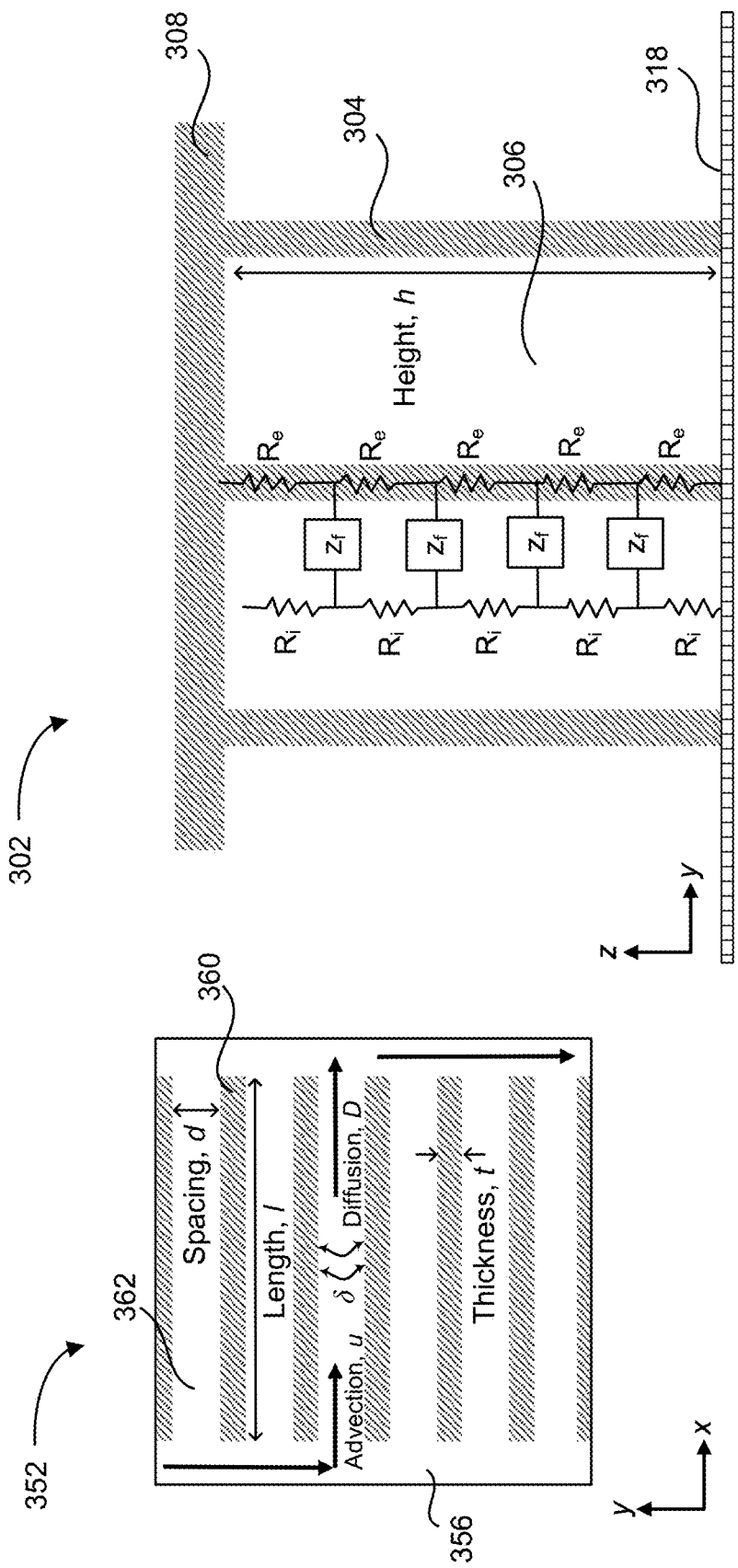
FIG. 7A depicts a schematic drawing of potential high diffusion of dissolved gas or soluble molecule to a solid surface of the corrugated electrode architecture, according to one inventive aspect.
FIG. 7B depicts a schematic drawing of a resistive network within the liquid and the solid phase of the corrugated electrode architecture, according to one inventive aspect.

FIGS. 7A and 7B illustrate characteristics of the corrugated architecture of the electrode, according to various inventive approaches. In one approach, FIG. 7A is a magnified view of a portion of the electrode 352 in part (b) of FIG. 3B. The corrugated architecture of the electrode 352 may allow high volumetric flow rates of fluid with minimal resistance. The arrangement of the larger first channels 356 with the smaller second channels 362 may minimize pressure drop of the flow of fluid from the inlet 307 of the electrode 352 to the outlet 309 of the electrode 352 (as illustrated in part (b) of FIG. 3B). In particular, the arrangement reduces the tortuosity and thus minimizes the viscous pressure drop by providing few turns during the flow of fluid. Thus, the architecture may result in tortuosity close or equal to 1 thereby preserving fluid momentum and minimizing viscous losses (e.g., momentum losses) in the channels. In preferred approaches, multiple length scales of first lands 354, first channels 356, second lands 360, and second channels 362 are included in the corrugated architecture electrode.

For example, as illustrated in FIG. 7A, and using approximations, pressure drop (P) of the flow of fluid across the reactor having a corrugated structure may be a function of area-specific volumetric flow rate, q, (Equation 1), fluid viscosity, u, and reactor geometry:

$$q = \frac{Q}{A}\left(\frac{\text{volumetric flow rate}}{\text{geometric area}}\right)\left[\frac{cm^3/s}{cm^2}\right] \qquad \text{Equation 1}$$

The following approximations may be made:

$$\Delta P_{lamella} \approx \frac{6q(2w+2l)(d+t)\mu l}{d^3 h} \qquad \text{Equation 2}$$

$$\Delta P_{channel} \approx \frac{32q(2w+2l)\mu L^2}{w^4} \qquad \text{Equation 3}$$

$$\Delta P_{total} = \Delta P_{lamella} + \Delta P_{channel} \qquad \text{Equation 4}$$

$$\Delta P_{total} \approx q\mu(2w+2l)\left(\frac{32L^2}{w^4} + \frac{6(d+t)l}{d^3 h}\right) \qquad \text{Equation 5}$$

In some approaches, the multiple length scales of dimensions of the first lands, first channels, second lands and second channels forming the channels and a structure having minimal turns during flow contribute to the low pressure drop value during flow of a fluid across the electrode thereby minimizing viscous inertial losses.

In some approaches, the corrugated architecture of the flow of fluid across the lands through the channels may reduce mass transport overpotential. Diffusion characteristics through the corrugated electrodes may be estimated according to the architecture of the electrode. A diffusion distance δ being an approximate distance for a passing molecule in a flowing liquid to diffuse to the wall of the channel closest to a membrane of a reactor may be used to select the spacing d between the lands, e.g., thereby defining a width of the channels in a direction perpendicular to the length l of the lands forming the channels. The approximate diffusion distance δ may be calculated as follows:

$$\delta = \sqrt{D\tau}, \qquad \text{Equation 6}$$
where
$$\tau = \frac{l}{u}$$

$$\delta^2 = D\frac{l}{u} \qquad \text{Equation 7}$$

where D is the diffusivity constant of the fluid of molecules, τ is a time constant, and u is the fluid velocity. For example, in the embodiment of FIG. 3A the spacing d of first channels 306 and 326 may be selected to be about equal to the diffusion distance for reactor 300 and a selected fluid. Similarly, in the embodiment of FIG. 3B the spacing d of the second channels 362 may be selected to be approximately equal to the diffusion distance for reactor 350 and a selected fluid. In some approaches, the difference between the spacing d and the diffusion distance δ can be selected to be within about 30% of the diffusion distance δ.

In some approaches, the diffusion distance δ which is perpendicular to the flow direction corresponding with spacing d of the channel closest to a membrane, may be increased by increasing length l of the land forming that channel. In some approaches, volumetric flow rate Q may be increased to increase fluid velocity u, and therefore a decrease spacing d may be preferred. An increase in the velocity u correlates to a decrease in the time the fluid resides within the channel. Thus, for optimal reaction conditions of a reactant in a flowing solution at an increased velocity u, the spacing d is preferably smaller so that the molecules of reactant may efficiently diffuse to the walls of the channels. The geometry of the corrugated electrodes may enable high diffusion of a dissolved gas to a solid surface. In some approaches, important diffusion length scales may be less than 10 μm.

In some approaches, a difference between an average width of a plurality of channels configured to be closes to the membrane of an electrode assembled into a reactor, e.g., the spacing d between the adjacent lands defining those channels, and the diffusion distance δ is less than 30%. In preferred approaches, the difference between the average width d of the channels of the electrode configured to be closest to a membrane when assembled into a reactor and the diffusion distance δ is less than 10% of the average width d of the channels.

Looking to the resistance network in FIG. 7B, the architecture of the corrugated electrode may enable potential for high electronic conductivity within the solid phase of the corrugated electrode. In addition, the design architecture may provide facile ionic conduction within the liquid phase.

The schematic drawing of FIG. 7B illustrates the first channels 306 and elongate first lands 304 in the y-z cross-section of the electrode 302, as originally presented in FIG. 3A. The configuration of the elongate first lands coupled to the membrane is also presented in FIGS. 3B, 4, and 6, in which the elongate second lands are coupled to the membrane. For purposes of illustration only, the schematic drawing of FIG. 7B shows the elongate first lands 304 projecting directly from the body 305 of the substrate 308. The membrane 318 is coupled directly to the elongate first lands 304 (e.g., lamella-like structures) with the first channels 306 defined between the elongate first lands 304. At least some of the elongate first lands 304 are interposed between the body 305 of the substrate 308 and the membrane 318. The substrate 308 may function as a current collector.

The conductivity characteristics are defined in terms of electronic resistance $R_e$ which is the resistance to electron flow. Any metal, conductor material, etc. will have some resistance to electron flow. The term of ionic resistance $R_i$ indicates the resistance to ionic flow. Typically, any liquid that has salt is going to have an ionic resistance. The faradaic impedance $z_f$ is a general term for faradaic impedance which consists of kinetic overpotential, which combines the energy barrier, resistance, impedance, etc. to do the desired chemical reaction.

The reaction location may be optimized according to a model including a linear combination of $R_e$, $R_i$, and $z_f$. The reaction location may be modeled at a nanometer scale, a millimeter scale, a centimeter scale, etc.

Total resistance may be largely dependent on electrolyte in the fluid and membrane conductivity. In one approach, the height h of the elongate first lands 304 may be minimized while still maximizing flow area (ionic resistance $R_i$ versus pumping resistance). In some approaches, a height h of the elongate lands may be preferably no greater than 500 μm (h≤500 μm). In exemplary approaches, $R_i \ll R_e$. In some approaches, faradaic impedance $z_f$ may depend on surface characteristics such as catalytic activity, crystal facet orientation, surface roughness, work function, etc. of the second lands/second channels.

Analytical reaction rates of reactants in the flowing fluid through the architecture of the corrugated electrode may be calculated according to parameters of the electrode. In some approaches, architecture of the corrugated electrode may be tuned to minimize power consumption while maximizing current density. For example, a reaction rate of a dissolved species per lamella (second land) may be approximated as:

$$m_o = Q_L(c_o - c_b)\exp\left(-\frac{2k_{mt}hl}{Q_L}\right) \quad \text{Equation 8}$$

which includes volumetric flow $Q_L$ between lamella, concentration of species in bulk $c_o$, concentration of species at surface/boundary $c_b$, and lengths as identified for electrode 352 in FIG. 3B: length L of elongate first land 354, length l of elongate second land 360, width w of first channel 356, width t of elongate second land 360, height h of elongate second land 360, spacing d between adjacent second land 360 defining the second channel 362 width, and width W of the full structure of electrode 352. Sherwood number Sh is calculated as:

$$Sh \sim \frac{Q_L}{dh}\frac{d}{2D_o} \quad \text{Equation 9}$$

And the connective mass transfer coefficient is:

$$k_{mt} \sim \frac{ShD_o}{2d} = \frac{Q_L}{4dh} \quad \text{Equation 10}$$

Assuming a perfect sink ($c_b$=0), reaction from a single lamella (second land) may be calculated as:

$$m_o = Q_L c_o\left(1 - \exp\left(-\frac{l}{2d}\right)\right) \quad \text{Equation 11}$$

Then, with number N of lamella per channel (second lands per first channel), number M of first channels per full area, a total system reaction rate $M_o$ may be calculated as:

$$M_o = m_o 2NM = 2m_o\left(\frac{L}{d+t}\right)\left(\frac{W}{2w+2l}\right) \quad \text{Equation 12}$$

The reaction rate $M_o$ may be converted to current density i with the number n of electrons per reaction, and Faraday's constant F as follows:

$$i = \frac{I}{A} = \frac{M_o nF}{LW}$$ Equation 13

$$i = \frac{2m_o nF}{(d+t)(2w+2l)}$$

In preferred approaches, an architecture of a corrugated electrode minimizes a power consumption while maximizing current density according to the following Equation 14:

$$P_{total} = iV_{oc} + i^2 r_{membrane} + in_{faradaic} + q\Delta P_{total}$$ Equation 14

Figure 8:
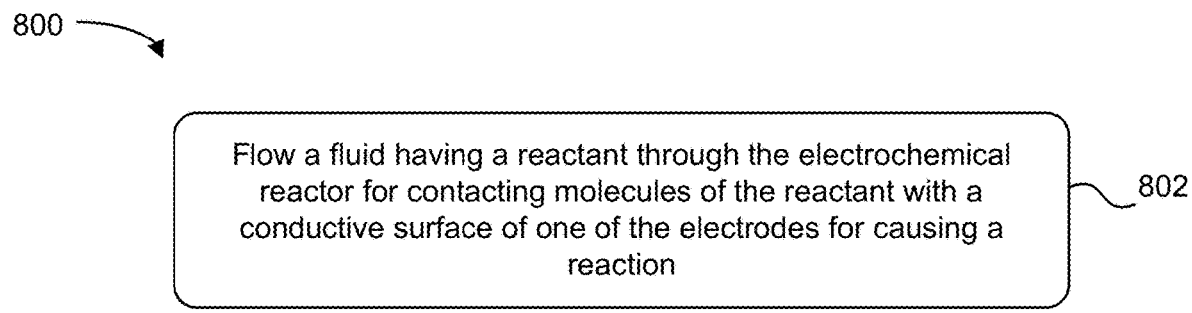
FIG. 8 is a flow chart of a method for using the electrochemical reactor for a chemical reaction, according to one inventive aspect.

FIG. 8 shows a method 800 using the electrochemical reactor having the architecture of a corrugated electrode, in accordance with one inventive aspect. As an option, the present method 800 may be implemented for using structures such as those shown in the other FIGS. described herein. Of course, however, this method 800 and others presented herein may be used with structures for electrochemical processes which may or may not be related to the illustrative embodiments listed herein. Further, the methods presented herein may be carried out in any desired environment. Moreover, more or fewer operations than those shown in FIG. 8 may be included in method 800, according to various embodiments. It should also be noted that any of the aforementioned features may be used in any of the embodiments described in accordance with the various methods.

In one approach, method 800 includes step 802 of flowing a fluid having a reactant through the electrochemical reactor for contacting molecules of the reactant with a conductive surface of one of the electrodes for causing a reaction. In one approach, flowing the fluid having a reactant through the electrochemical reactor includes molecules of the reactant contacting the conductive surface of one of the electrodes, e.g., the cathode, for enabling a reaction, e.g., causing a reaction. In various approaches, the fluid includes one of the following liquids: an aqueous solution, a nonpolar solution, an organic solvent, an ionic liquid, a mixture of a gas and a liquid, etc. For example, the liquid may include water, isopropanol, benzene, etc.

In some approaches, the flowing fluid is an aqueous liquid including a salt. For example, the salt may include carbonate, e.g., potassium carbonate ($KHCO_3$). The liquid may include a salt having a concentration in a range of 10 mM to about 5 M. In some approaches, the liquid may include a hydroxide, e.g., sodium hydroxide, potassium hydroxide, etc. In one approach, the liquid may include an acid, e.g., sulfuric acid, hydrochloric acid, etc.

Referring to the flow of fluid for electrode 352 in FIG. 3B, in various approaches, the reaction of step 802 in may include soluble reactants entering at the fluid flow inlet 307 and flowing into the first channels 356. The reactants in the fluid may then flow over the first land 354 and through the second channels 362. Within the second channels 362, reactants may diffuse to the second land 360 surface and undergo an electron transfer (faradaic) process. The product molecule may then diffuse back to the second channel 362, flow through first channel 356, and exit through the fluid flow outlet 309. Alternatively, the product molecule may diffuse through a substrate comprising a porous material, e.g., as illustrated for electrode 402 in FIG. 4.

Referring back to FIG. 8, in some approaches, the reaction of step 802 may form a product, where the product is a commodity chemical. For example, a commodity chemical may include benzene, toluene, xylene, cyclic hydrocarbons, etc. In one approach, glycerol may flow through the CEA allowing for a high surface area for electron transfer to form glyceraldehyde by oxidation at the anode. In another approach, carbon dioxide dissolved in water may flow through the CEA allowing for a high utilization conversion to carbon monoxide by reduction at the cathode. In one approach, the flow geometries of the CEA allow oxidation or reduction reactions of cyclic hydrocarbons, e.g., BTX (benzene, toluene, and xylene).

In some approaches, the reaction of step 802 may form a product, where the product is a specialty chemical. For example, a specialty chemical may include aromatic hydrocarbons such as anthraquinones, etc. For example, soluble quinones may diffuse to a second land surface and undergo multi-electron redox processes to convert to other organic molecules, such as hydroquinones, functionalized quinones, etc. In one approach, the flow geometries of the CEA allows oxidation/reduction of anthraquinones.

In other approaches, the reaction of step 902 may form a product, where the product includes a pharmaceutical compound. For example, a pharmaceutical chemical may include dixiamycin B., paracetamol, sumanirole etc. For example, electrochemical reduction may be used to convert tris(pyrrolidino)phosphoramide to sumanirole, a dopamine receptor agonist. Also, xiamycin A may be dimarized via an electrochemical oxidation to form dixiamycin B. Pharmaceutical compounds tend to be complicated for chemical reactions due to low yields. The architecture of the corrugated electrodes as described herein may increase yields and energy efficiency in production of pharmaceutical compounds. By using electrochemical reactions and surface area reactor described herein optimized reaction rates may result in higher yields of pharmaceutical compounds. Moreover, improving those reaction rates while minimizing catalytic exposure times prevents overreaction, which may often be a problem with highly reactive chemicals.

In one approach, a CEA may be configured for gas-to-gas conversion. For example, the CEA geometry would preferably have a gas diffusion layer to allow a gas (e.g., $CO_2$, $N_2$, etc.) to flow into the electrode and through the porous material of the substrate, then the gas reaches the catalyst layer forming a triple phase region of solid (catalyst), liquid (flowing through the corrugated electrode), and gas for an electrochemical reaction to form the desired products. The gas enters the liquid and reacts on the surface of the catalyst layer. For example, using electricity in the system, the $CO_2$ gas may be converted to methane gas. The formed gas would leave the liquid layer back through the catalyst layer, up through the gas diffusion layer, and out of the system.

In another example of a gas-to-gas conversion, nitrogen gas ($N_2$) may flow in to react at the triple phase interface at the catalyst to form ammonia ($NH_3$). The liquid in the system may comprise a lithium salt instead of an aqueous media that is used in $CO_2$ conversion.

In another approach, a CEA may be configured for gas-to-liquid conversion. A gas, e.g., $CO_2$, may enter the CEA via the porous layer of the substrate and flow to the catalyst layer. At the catalyst, a triple phase interface forms that involves gas:solid:liquid. The $CO_2$ at the catalyst layer then reacts in the liquid portion, and undergoes a gas to liquid conversion, e.g., ethanol, and then the converted liquid product would be carried away by the flow in the corrugated electrode. A liquid in this system may preferably be a carbonate aqueous solution, e.g., potassium carbonate. In one approach, a potential may be applied to generate the gas-to-liquid conversion, providing electricity to drive the conversion.

In some approaches, method 800 may include collecting a product. Reactants diffusing through the CEA may physisorbe, chemisorbe, undergo electrochemical absorption, etc. to the electrode surface. Electric potential, heat, etc. may be used to facilitate both adsorption and dis-adsorption of the reactant enabling reactant concentration and collection. In one approach, a liquid may be collected. In another approach, a dissolved molecule may be collected. In another approach, a gas may be collected.

In one approach, the electrochemical reaction in the CEA may produce energy. In another approach, the electrochemical reaction in the CEA may consume energy.

This corrugated electrode architecture is amenable to a wide variety of electrochemical systems including flow batteries, fuel cells, electrolyzers, salt-splitting, and $CO_2$ utilization reactors.

Figure 9:
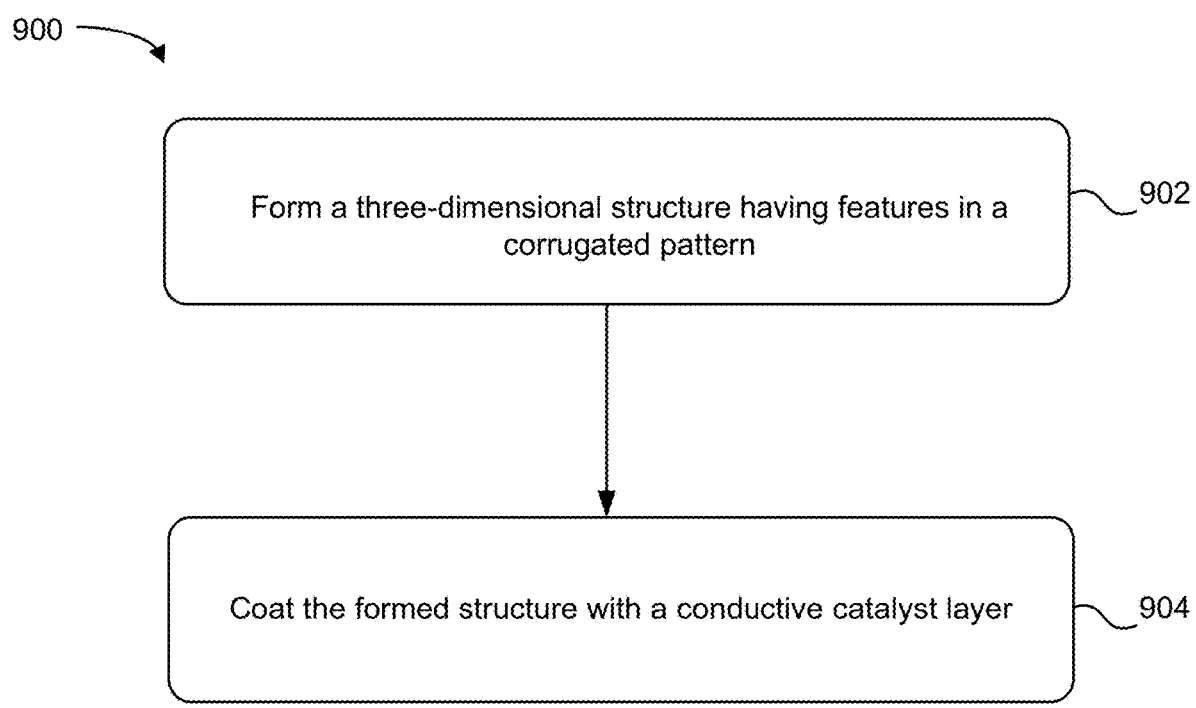
FIG. 9 is a flow chart of a method for forming a corrugated electrode architecture, according to one inventive aspect.

Electrodes having corrugated architecture (CEAs) may be fabricated using both traditional and advanced manufacturing techniques, or a combination of the two. FIG. 9 shows a method 900 for fabricating an electrode having corrugated architecture, in accordance with one inventive aspect. As an option, the present method 900 may be implemented to construct structures such as those shown in the other FIGS. described herein. Of course, however, this method 900 and others presented herein may be used to form structures for a wide variety of devices and/or purposes which may or may not be related to the illustrative embodiments listed herein. Further, the methods presented herein may be carried out in any desired environment. Moreover, more or fewer operations than those shown in FIG. 9 may be included in method 900, according to various embodiments. It should also be noted that any of the aforementioned features may be used in any of the embodiments described in accordance with the various methods.

Method 900 includes step 902 of forming a 3D structure having features in in a corrugated pattern. In various approaches, a CEA may be formed by different methods of additive manufacturing. As described herein, the method forms structures that may maintain structural integrity during operation. The structural integrity includes material strength and optimization of interfacial contacts. Tailoring material density and geometry allows tuning overall strength of the electrode structure.

In one approach, the corrugated architecture may be fabricated by stamping metal sheets, using dicing machinery (e.g., dicing saw), machining channels in stock materials, skiving, nano-skiving, through microfabrication processes including lithography, etc. In another approach, electrodes may be 3D printed; in yet another approach, non-metal structures may be made conductive using electroless deposition or by physical or chemical deposition (PVD and CVD), and metal structures can be made from direct ink write (DIW) with conductive inks, or through powder- or melt-based advanced manufacturing.

Figure 10A:
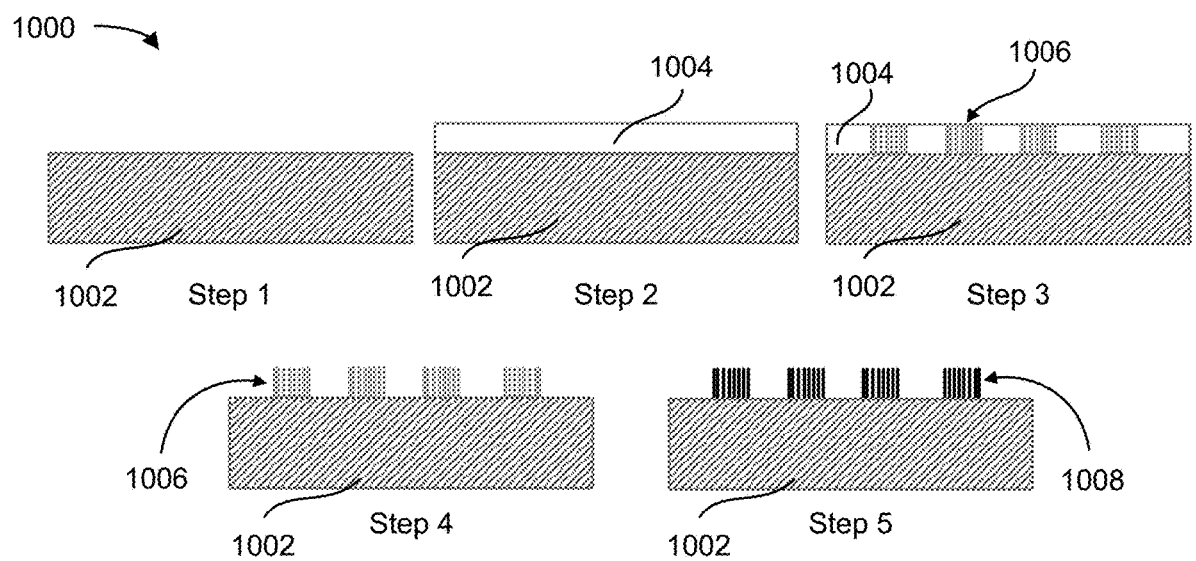
FIG. 10A is a schematic diagram of a fabrication process for corrugated electrode architecture (CEA) using microfabrication techniques, according to one inventive aspect.
Figure 10B:
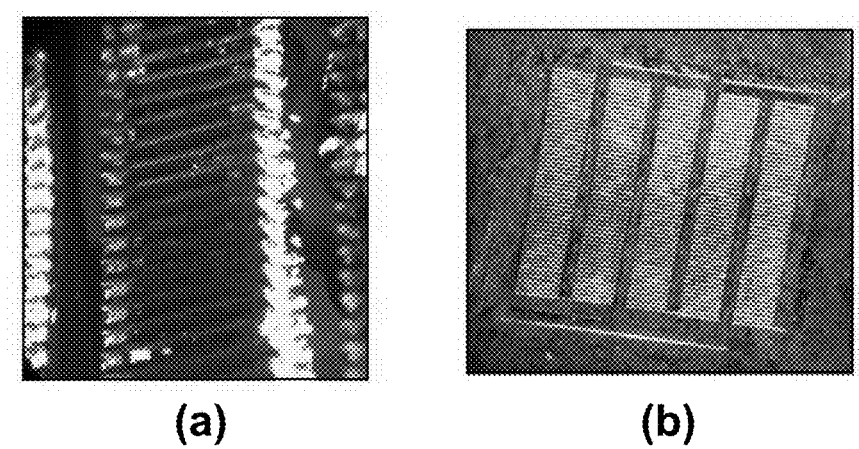
FIG. 10B are images of corrugated electrode architecture fabricated using microfabrication techniques, according to one inventive aspect. Part (a) is a magnified view of a portion of a corrugated electrode architecture, and part (b) is a top view of a corrugated electrode architecture with an interdigitated flow field.

As illustrated in FIG. 10A, a CEA structure may be fabricated using a process 1000 including microfabrication. Exemplary microfabrication techniques include lithography, sol-gel method, micro-stamping, micro-cutting, etching, thin film growth, physical and chemical vapor deposition (PVD, CVD), atomic layer deposition (ALD), electroplating, etc. using methodology generally understood by one skilled in the art. Step 1 begins with a substrate 1002, typically a conductive material (e.g., copper). Step 2 includes coating the substrate 1002 with a photoresist material 1004.

Step 3 includes two approaches to patterning the photoresist material 1004. In one approach, the photoresist may be patterned to form trenches, e.g., a mold for the structures, followed by developing the resist to expose the trenches, and infilling the trenches with a permanent support material to form lamella-like structures 1006 to form a corrugated pattern. For example, the corrugated pattern may be infilled (e.g., electroplating) with material such as copper. Following the infill of material, the surface may be sanded and/or polished into a planar surface. In some approaches, a planar surface may enable more controlled interfacial contact with separators, membranes, etc. Alternatively, in another approach, the photoresist may be patterned to form lamella-like structures. The structures 1006 may be elongate lands, channels, etc.

Step 4 includes developing or stripping the photoresist to expose the lamella-like structures.

In another approach, lithography techniques may be used to etch the substrate to form lamella-like structures. For example, a substrate may be coated with a photoresist and patterned as a lamella-like structure. The resist is developed. The photoresist-substrate may be etched to form channels. The resist is then stripped from the substrate.

In some approaches, referring back to FIG. 9, a method 900 may include step 904 of coating the formed structure with a conductive catalyst layer. As shown in step 5 of FIG. 10A, following developing the photoresist, the lamella structures may be coated with a catalyst material 1008.

Advantages of a microfabrication technique include the ability to form structure in a large area with small features. In various approaches, looking back to part (d) of FIG. 3B, features may be defined as the thickness t of the second lands 360 (e.g., lamella-like structures) of the corrugated structure, spacing d between the elongate second lands 360 of the corrugated structure, the height h of the elongate second lands 360, etc. In some approaches, the features such as the width t and spacing d formed by microfabrication may be in a range of 0.1 to 10,000 µm (1 cm) but may be larger or smaller. In some approaches, the spacing d may be in a range of about 0.1 to about 1,000 µm. In some approaches, the spacing d may be in a range of about 100 to about 1,000 µm. In other approaches, the spacing d may be in a range of about 100 to about 5,000 µm.

Figure 11A:
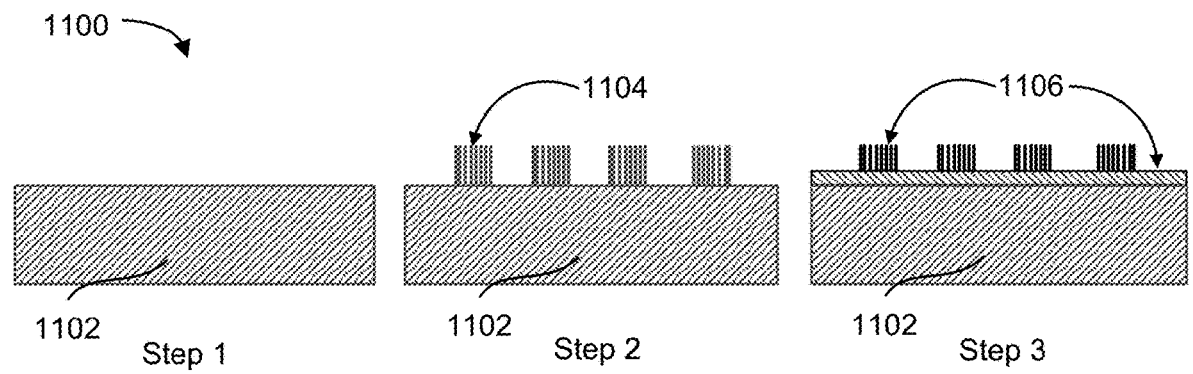
FIG. 11A is a schematic diagram of a fabrication process for a corrugated electrode architecture using advanced manufacturing techniques, according to one inventive aspect.
Figure 11B:
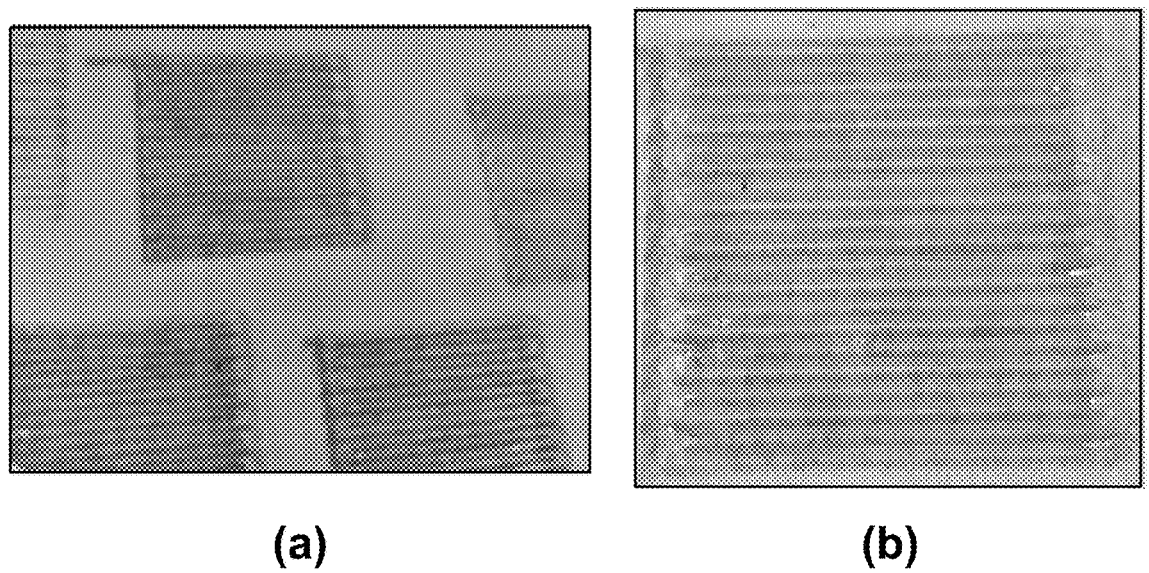
FIG. 11B are images that show a corrugated electrode architecture fabricated using advanced manufacturing techniques, according to one inventive aspect. Part (a) is a top view of several corrugated electrode architectures, and part (b) is a magnified view of one corrugated electrode architecture structure.

An example of a corrugated electrode as formed by microfabrication techniques is shown in images of FIG. 11B. Part (a) is an image of a magnified view of a series of lands, e.g., lamella, defining a series of channels. The structures are coated with a copper material. Part (b) is an image of the series of lands arranged in a pattern forming an interdigitated flow field on a copper substrate.

Table 1 lists the results of $CO_2$ reduction using the electrode fabricated in FIG. 10A having the corrugated architecture as described herein. The Faradaic Efficiency (%) is listed for various products during an aqueous phase electrochemical $CO_2$ reduction of 1 M $KHCO_3$ at 25 mA/cm$^2$.

In one inventive aspect, the electrode having corrugated architecture may be a 3D printed structure. In various approaches the 3D printed structure may have physical characteristics of formation by an additive manufacturing technique such as direct ink writing (DIW) process on physical vapor deposition (PVD)-produced GDEs. This process can be modified to use the polymer layer as a template for conductive layer growth. Other methods may include electrophoretic deposition (EPD), projection

TABLE 1

| Aqueous phase electrochemical $CO_2$ reduction | |
|---|---|
| Product | Faradaic Efficiency (%) |
| $H_2$ | 82.8 |
| CO | 1.8 |
| $CH_4$ | 4.2 |

TABLE 1-continued

Aqueous phase electrochemical $CO_2$ reduction

| Product | Faradaic Efficiency (%) |
|---|---|
| $HCOO^-$ | 15.3 |
| MeOH | 0.3 |
| Acetic Acid | 0.9 |
| TOTAL | 105.3* |

*Deviation likely due to water evaporation during experiment microstereolithography, powder bed fusion, selective laser sintering, 2-photon lithography, etc.

In one inventive aspect, forming a 3D printed structure is highly scalable and compatible with additive manufacturing (e.g., three-dimensional (3D) printing) methods such as direct ink writing (DIW) and projection micro-stereolithography (PµSL). In various approaches, the structure has physical characteristics of formation by an additive manufacturing technique. In various approaches, physical characteristics may include filaments arranged in a geometric pattern, a patterned outer surface defined by stacking filaments, a defined porosity (e.g., ordered, controlled, non-random, etc.), a porosity having pores with measurable average diameters, etc. Thus, using these additive manufacturing techniques allows engineering of parts and production of optimal geometry for efficient mass transport and mechanical strength.

Advantages of these additive manufacturing processes includes fewer steps in the process, a wider range of substrate materials, e.g., porous substrate materials, etc. However, some additive manufacturing process provide challenges for obtaining feature sizes smaller than 100 µm. In DIW processes, the features size may be determined by the nozzle sizes of the DIW apparatus. Smaller diameter nozzles would generate smaller features sizes. Moreover, DIW process allow the formation of structures having ridges, edges defined by the diameter of the extrusion nozzle, a plurality of uniform features, etc.

Forming a 3D structure (step 902 of method 900) may include a process 1100, as illustrated in FIG. 11A. Process 1100 using DIW begins with Step 1 obtaining a substrate 1102, e.g., porous PTFE. Step 2 includes printing a 3D pattern 1104 directly on the substrate 1102. The 3D printing includes using an ink to form the 3D pattern 1104. In some approaches, the ink may include silicone polymer.

Forming a 3D structure may include additive manufacturing techniques generally understood by one skilled in the art, e.g., DIW, electrophoretic deposition (EPD), projection microstereolithography, 2-photon lithography, etc.

Coating the formed 3D structure with a conductive catalyst layer (step 904 of method 900) includes using methodology generally understood by one skilled in the art, e.g., plasma vapor deposition (PVD), electroless plating solutions, EPD, powder bed fusion, selective laser sintering, etc. As illustrated in Step 3 of FIG. 11A, the formed structure may be coated with a conductive catalyst layer 1106. One approach for coating a lamella-like structure may include coating the substrate with a catalyst material, and then forming a 3D structure having the lamella-like patterns onto the substrate, followed by coating the 3D structure with additional catalyst material. Another approach for coating a structure may include forming a 3D structure onto a substrate, and then coating the 3D structure with a catalyst material.

Examples of corrugated structures formed by 3D printing, e.g., DIW, are shown in the images of part (a) and part (b) of FIG. 11B. Part (a) shows multiple printings of a corrugated structure. Part (b) shows a magnified view of one corrugated structure that may be coated with catalyst material.

Because of the regular, periodic structure permitted by CEAs, a one-dimensional (1D) analytical model was created to predict their performance in an all-liquid configuration. This model incorporates multiple variables including volumetric fluid flow rates, species concentrations, geometric layout, applied current density, and materials properties (e.g., conductivity, viscosity, etc.). The model may predict the energy losses stemming from ohmic resistance, mass transport overpotentials, faradaic overpotentials, and fluid viscous loss. The model demonstrate that the performance of typical electrochemical devices can be increased by an order of magnitude and can be used to predict the optimal architecture geometry for a given application.

Figure 12A:
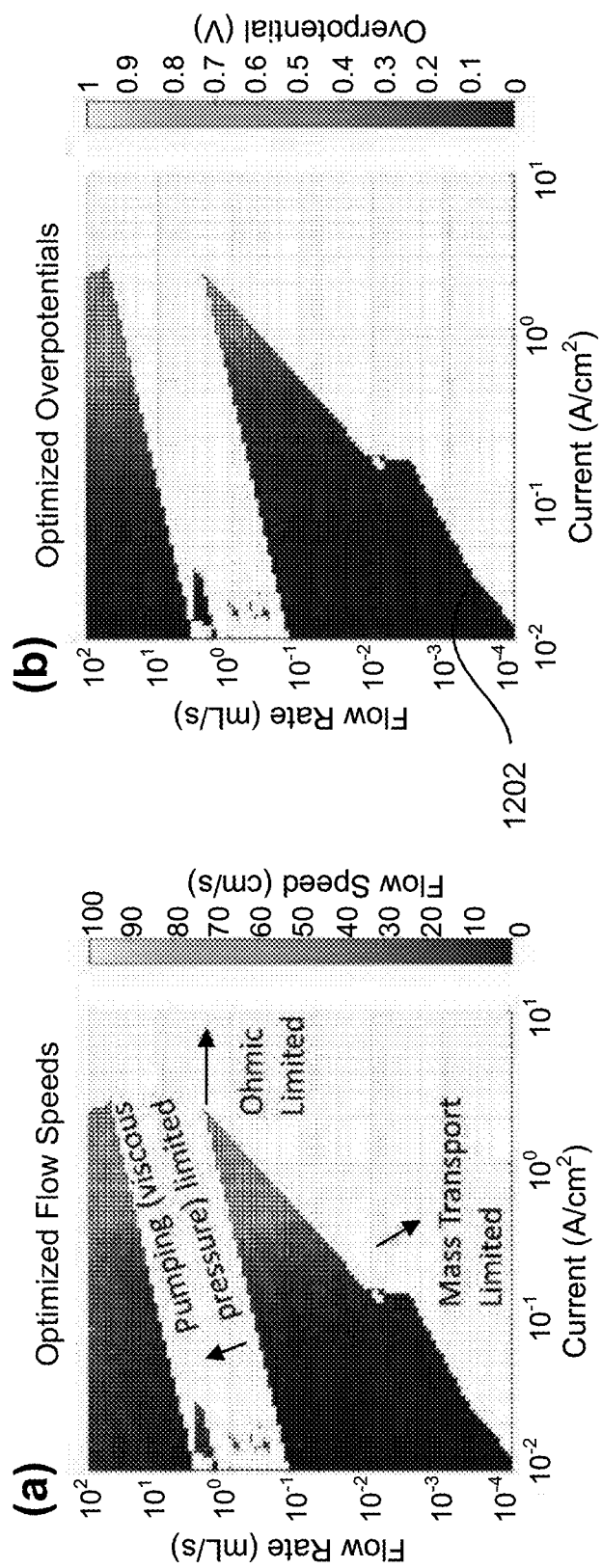
FIG. 12A depicts plots of the architectural optimization algorithm of a corrugated electrode architecture for optimized flow speeds (part (a)) and optimized overpotentials (part (b)).
Figure 12B:
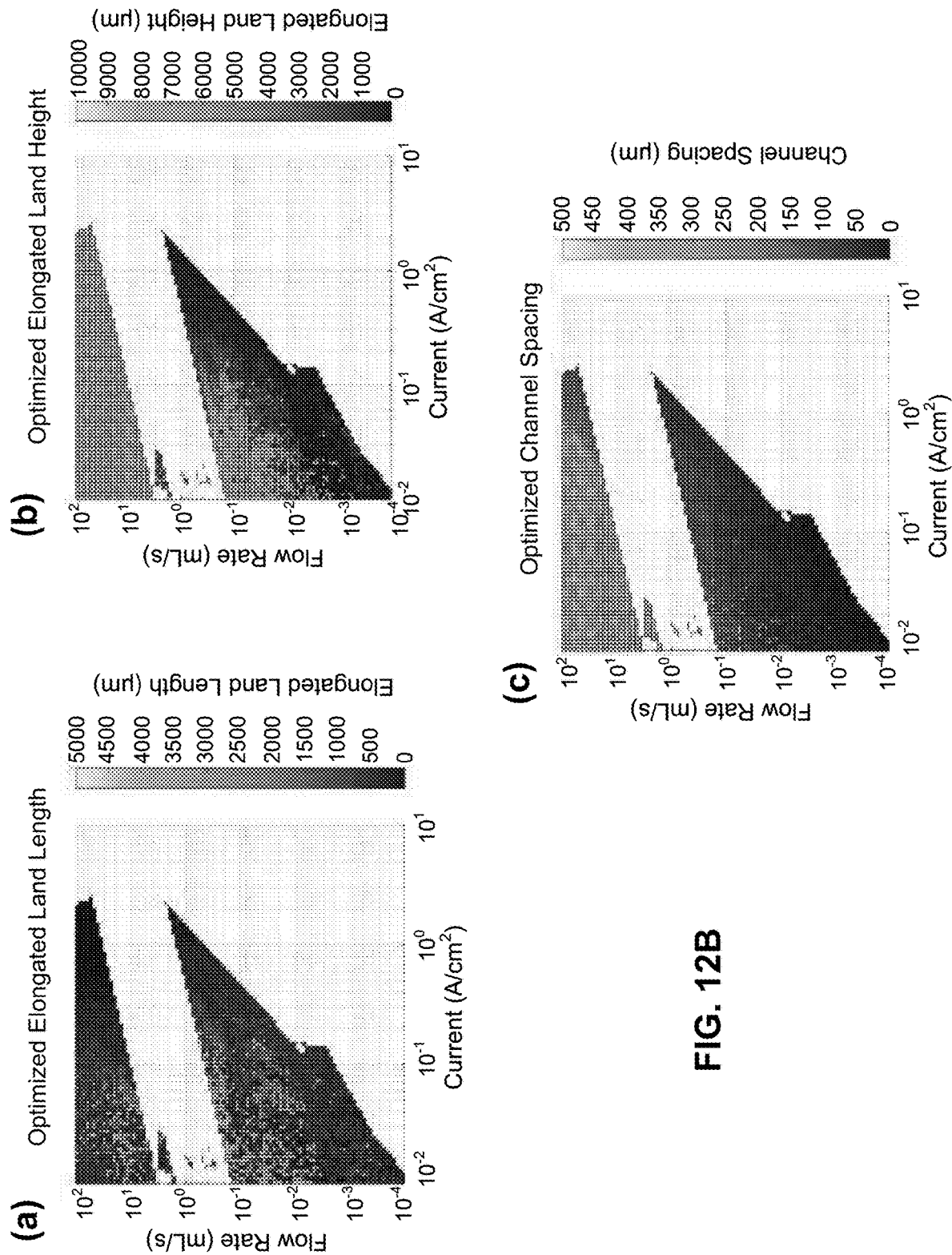
FIG. 12B is a series of plots that compare the architectural optimization algorithm for physical characteristics of lamella-like structures. Part (a) plot of optimized lengths of the elongate lands, part (b) plot of optimized height of the elongate lands, and part (c) plot of optimized spacing of the channels.

The results from modeling the electrochemical reduction of dissolved $CO_2$ at its solubility limit in aqueous solutions at standard temperatures and pressures (STP) are depicted in FIGS. 12A-12B. Each plot depicts parameters of a corrugated electrode optimized for flow rate (y-axis) versus current (x-axis). The shaded gradient (right column of each plot) provides the variations of each parameter. FIG. 12A depicts plots of optimal linear flow speed, part (a), calculated from the volumetric flow rate and the cross-sectional area of the optimized second land and channel dimensions, and optimized overpotentials, part (b). The optimal linear flow speeds are related to the approximate diffusion distance δ according to Equation 7 and impact the single-pass conversion efficiency of the electrochemical system. In some approaches, the flow speed (e.g., linear velocity) may be in a range of greater than 0.1 to about 1,000 cm/s.

The optimized overpotentials may be described as a limitation of the gas diffusion electrode (GDE). In conventional GDE systems, there tends to be a very high energy penalty because of geometry. As shown in part (b), the corrugated architecture lowers that energy penalty, e.g., the energy penalty being the over potential. In the particular optimization of part (b), the lowest over potential 1202 is the smallest energy penalty given a use of the electrode. In other words, system to be powered at a certain current density correlates to a certain reactant throughput (flow rate).

Part (a) of FIG. 12B includes a plot of optimal length l of at least some of the elongate first lands (e.g., lamella-like structure) where the length l of the elongate first lands or second lands is illustrated in the drawings of FIGS. 3A, 3B, respectively and relates to the fluid resident time by Equation 7 and pressure drop in Equation 5. Part (b) of FIG. 12B depicts the optimized height h of the elongate first land (e.g., lamella-like structures), which correlates with the height of the walls forming the corrugated passages of the channels defined between the elongate lands. The height h is measured in the z-direction as illustrated in FIGS. 3A and 3B. Part (c) of FIG. 12B depicts the optimized spacing d between the elongate first lands or second lands (e.g., the lamella-like structures) which corresponds to the width of the channels, through which the fluid flows (e.g., spacing between corrugations, walls, columns, etc. measured in the y-direction as depicted in the drawings of FIGS. 3A and 3B). An optimized system may be built

TABLE 2

Comparison of Electrochemical Reactors

| Parameter | Conventional Cell Architecture | Corrugated Electrode Architecture | Change in Parameter | Comments |
|---|---|---|---|---|
| Ohmic Resistance | 20 $\Omega/cm^2$ | <1 $\Omega/cm^2$ | >20× | Minimized form factor Greater conductivity |
| Electronic current density | 200-400 $mA/cm^2$ (gas fed) | 500-1000 $mA/cm^2$ (liquid fed) | ~2× | Increased mass transport 1.9 $A/cm^2$ theoretical mass, may increase when gas-fed |
| Selectivity for $C_2+$ | >50% ethylene <10% $H_2$ | >50% ethylene <10% $H_2$ | <1× | Removing mass-transport limits allows greater $(C-C)_n$ coupling |
| System Engineering | No | Yes |  | Architecture is amenable to current fabrication techniques and intrastructure | according to optimized parameters as tested. The gaps in each plot represent physical limitations that are described in the plot of part (a) of FIG. 12A in which the system was limited by pumping (viscous pressure), ohmic, and mass transport losses.

Table 2 includes a comparison of parameters using a conventional cell similar parameters using a cell having the architecture of a corrugated electrode, according to various inventive aspects described herein. The conventional cell architecture is based on a GDE architecture with a 14 mm electrolyte gap including a membrane. The CEA architecture values are notional but demonstrate the significant potential for improvements in energy efficiency and throughput via decreased ohmic resistance and minimized overpotential and increased electronic current density.

According to one approach, building in 3D allows for intensified reactor components. The advantage of an integrated design reduces complexity typical of conventional systems and eliminates need for costly separations.

In Use

Various inventive aspects described herein disclose advanced manufacturing systems that may be applied to electrochemical systems. Moreover, some inventive aspects include electrochemical carbon dioxide conversion technologies.

The inventive concepts disclosed herein have been presented by way of example to illustrate the myriad features thereof in a plurality of illustrative scenarios, inventive aspects, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various inventive aspects have been described above, it should be understood that they have been presented by way of example only, and not limitation. Thus, the breadth and scope of an inventive aspect of the present invention should not be limited by any of the above-described exemplary inventive aspects but should be defined only in accordance with the following claims and their equivalents.

What is claimed is:

1. An electrode comprising:
   a substrate having a body extending along an x-y plane and a plurality of elongate first lands projecting away from the body in a z direction oriented perpendicular to the x-y plane, each pair of adjacent lands defining a first channel therebetween,
   wherein each of the plurality of elongate first lands has a longitudinal axis extending about parallel to the x-y plane,
   wherein the substrate includes a plurality of elongate second lands that extend from at least one of the plurality of first lands,
   wherein longitudinal axes of the second lands extend along the x-y plane and are oriented at an angle from the longitudinal axis of the at least one of the plurality of first lands, wherein the angle is in a range of 5° to 90°, each pair of adjacent second lands defining a second channel therebetween, wherein lengths of the respective second channels along the associated second lands is about equal to the distance between the first channels adjacent the respective second channels;
   an inlet; and
   an outlet, wherein the plurality of first channels are configured to allow flow of fluid from the inlet to the outlet.

2. The electrode as recited in claim 1, further comprising a catalyst material, wherein the catalyst material is present on a surface at least some of the elongate first lands within at least some of the plurality of first channels.

3. The electrode as recited in claim 1, wherein a width of a second channel is defined as a spacing between each pair of adjacent second lands that extend from a same one of the first lands, and a longitudinal length of each adjacent second land is about equal to a width of the first land that the adjacent second lands extend from, wherein the longitudinal length of each adjacent second land is greater than the width of the second channel therebetween.

4. The electrode as recited in claim 1, wherein the plurality of first lands are arranged in an interdigitated flow field geometry.

5. The electrode as recited in claim 1, wherein a longitudinal length of each of at least some of the first lands as measured along the longitudinal axis of the respective first land is greater than an average width of an adjacent first channel as measured between the adjacent first lands defining the respective first channel.

6. The electrode as recited in claim 1, wherein a ratio of a height to an average width of each of at least some of the first channels is in a range of about 1 to about 100, wherein the average width of the respective first channel is the average distance between the adjacent first lands defining the respective first channel.

7. The electrode as recited in claim 1, wherein a height of at least some of the first lands is in a range of greater than 0 microns and less than about 100,000 microns.

8. The electrode as recited in claim 1, wherein the substrate is comprised of an electrically conductive material.

9. The electrode as recited in claim 8, wherein the electrically conductive material is selected from the group consisting of: a metal, a metal alloy, a metal oxide, a metal nitride, a metal compound, a carbon group element, a functionalized carbon, a semiconductor material, a noble metal, a conductive oxide, and a transition metal.

10. The electrode as recited in claim 1, wherein the electrode is a printed three-dimensional structure.

11. The electrode as recited in claim 10, wherein the printed three-dimensional structure has physical characteristics of formation by an additive manufacturing technique selected from the group consisting of: projection microstereolithography, direct ink writing, and electrophoretic deposition.

12. An electrode comprising:
   a substrate having a body extending along an x-y plane and a plurality of elongate first lands projecting away from the body in a z direction oriented perpendicular to the x-y plane, each pair of adjacent lands defining a first channel therebetween,
      wherein each of the plurality of elongate first lands has a longitudinal axis extending about parallel to the x-y plane,
      wherein the plurality of first lands are arranged in an interdigitated flow field geometry,
      wherein the substrate includes a plurality of elongate second lands that extend from at least one of the plurality of first lands, the elongate second lands projecting away from the elongate first lands in a z-direction oriented perpendicular to the x-y plane,
      wherein a longitudinal axis of each of the second lands is perpendicular to the longitudinal axis of each of the first lands;
   an inlet; and
   an outlet, wherein a plurality of first channels are configured to allow flow of fluid from the inlet to the outlet.

13. The electrode as recited in claim 12, further comprising a catalyst material, wherein the catalyst material is present on a surface at least some of the elongate first lands within at least some of the plurality of first channels.

14. The electrode as recited in claim 12, wherein a width of a second channel is defined as a spacing between each pair of adjacent second lands that extend from a same one of the first lands, and a longitudinal length of each adjacent second land is about equal to a width of the first land that the adjacent second lands extend from, wherein the longitudinal length of each adjacent second land is greater than the width of the second channel therebetween.

15. The electrode as recited in claim 12, wherein a longitudinal length of each of at least some of the first lands as measured along the longitudinal axis of the respective first land is greater than an average width of an adjacent first channel as measured between the adjacent first lands defining the respective first channel.

16. The electrode as recited in claim 12, wherein a ratio of a height to an average width of each of at least some of the first channels is in a range of about 1 to about 100, wherein the average width of the respective first channel is the average distance between the adjacent first lands defining the respective first channel.

17. The electrode as recited in claim 12, wherein a height of at least some of the first lands is in a range of greater than 0 microns and less than about 100,000 microns.

18. The electrode as recited in claim 12, wherein the substrate is comprised of an electrically conductive material.

19. The electrode as recited in claim 18, wherein the electrically conductive material is selected from the group consisting of: a metal, a metal alloy, a metal oxide, a metal nitride, a metal compound, a carbon group element, a functionalized carbon, a semiconductor material, a noble metal, a conductive oxide, and a transition metal.

20. The electrode as recited in claim 12, wherein the electrode is a printed three-dimensional structure.

21. The electrode as recited in claim 20, wherein the printed three-dimensional structure has physical characteristics of formation by an additive manufacturing technique selected from the group consisting of: projection microstereolithography, direct ink writing, and electrophoretic deposition.

22. The electrode as recited in claim 1, wherein a ratio (d/t) of an average spacing (d) between adjacent second lands defining the second channel therebetween and an average thickness (t) of the adjacent second lands is in a range of 1 to 1000.

* * * * *